US012789795B2

(12) United States Patent
Horita et al.

(10) Patent No.: US 12,789,795 B2
(45) Date of Patent: Nov. 10, 2026

(54) ELECTRONIC CONTROL APPARATUS AND PLANNING METHOD

(71) Applicant: Hitachi Astemo, Ltd., Hitachinaka (JP)

(72) Inventors: Yuki Horita, Tokyo (JP); Ryoh Inaba, Tokyo (JP); Daniel Gabriel, Tokyo (JP); Tatsuhiko Monji, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/993,615

(22) PCT Filed: Jun. 29, 2023

(86) PCT No.: PCT/JP2023/024140
§ 371 (c)(1),
(2) Date: Jan. 13, 2025

(87) PCT Pub. No.: WO2024/029243
PCT Pub. Date: Feb. 8, 2024

(65) Prior Publication Data

US 2026/0014979 A1 Jan. 15, 2026

(30) Foreign Application Priority Data

Aug. 3, 2022 (JP) ................................ 2022-124391

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0956* (2013.01); *B60W 30/18163* (2013.01);
(Continued)

(58) Field of Classification Search
CPC ............ B60W 30/09; B60W 60/0015; B60W 60/00274; B60W 30/0956;
(Continued)

(56) References Cited

U.S. PATENT DOCUMENTS

| | | | | |
|---|---|---|---|---|
| 11,565,718 | B2 * | 1/2023 | Matsunaga | B60W 40/105 |
| 2017/0089710 | A1 * | 3/2017 | Slusar | G06Q 40/08 |

(Continued)

FOREIGN PATENT DOCUMENTS

| | | | |
|---|---|---|---|
| DE | 10 2018 203 083 | A1 | 9/2019 |
| JP | 2017-224237 | A | 12/2017 |

(Continued)

OTHER PUBLICATIONS

International Search Report (PCT/ISA/210) issued in PCT Application No. PCT/JP2023/024140 dated Aug. 22, 2023 with English translation (5 pages).

(Continued)

*Primary Examiner* — Gertrude Arthur Jeanglaude
(74) *Attorney, Agent, or Firm* — Crowell & Moring LLP

(57) ABSTRACT

An electronic control apparatus is mounted on a vehicle and includes an information acquiring section that acquires traveling environment information concerning a traveling environment around the vehicle, an immobility risk area estimating section that estimates an immobility restriction area on the basis of the traveling environment information, the immobility restriction area being an area where, if the vehicle is immobilized therein, the vehicle obstructs an action by a mobile object other than the vehicle, and being an area where immobility of the vehicle is restricted, and a traveling control planning section that plans traveling control of the vehicle on the basis of the estimated immobility restriction area.

12 Claims, 36 Drawing Sheets

(51) Int. Cl.

| | |
|---|---|
| ***B60W 30/18*** | (2012.01) |
| ***B60W 50/00*** | (2006.01) |
| ***B60W 60/00*** | (2020.01) |

(52) U.S. Cl.
CPC .... *B60W 50/0097* (2013.01); *B60W 60/0015* (2020.02); *B60W 60/00274* (2020.02); *B60W 2554/4045* (2020.02); *B60W 2555/60* (2020.02)

(58) Field of Classification Search
CPC ....... B60W 30/18163; B60W 50/0097; B60W 2555/60; B60W 2554/4045
See application file for complete search history.

(56) References Cited

U.S. PATENT DOCUMENTS

| | | | |
|---|---|---|---|
| 2018/0105174 A1 | 4/2018 | Russell et al. | |
| 2019/0333386 A1 | 10/2019 | Horita et al. | |
| 2020/0398864 A1 | 12/2020 | Yamaguchi et al. | |
| 2021/0300420 A1* | 9/2021 | Matsunaga | G06V 20/588 |
| 2021/0309231 A1* | 10/2021 | Fujita | G01C 21/3841 |
| 2022/0256082 A1* | 8/2022 | Namba | G01C 21/30 |
| 2022/0289189 A1* | 9/2022 | Komuro | B60W 30/18145 |
| 2023/0174106 A1 | 6/2023 | Xiang et al. | |
| 2023/0234573 A1* | 7/2023 | Iwase | B60W 30/09 701/26 |

FOREIGN PATENT DOCUMENTS

| | | | |
|---|---|---|---|
| JP | 2019-32721 | A | 2/2019 |
| JP | 2019-70900 | A | 5/2019 |
| JP | 2019-537530 | A | 12/2019 |
| WO | WO 2019/239747 | A1 | 12/2019 |
| WO | WO 2022/025087 | A1 | 2/2022 |

OTHER PUBLICATIONS

Japanese-language Office Action issued in Japanese Application No. 2022-124391 dated Feb. 24, 2026 with English translation (10 pages).

Extended European Search Report issued in European Application No. 23849802.6 dated Jul. 16, 2026 (18 pages).

* cited by examiner

FIG. 3

COORDINATED ACTION DATA GROUP 34

| ACTION ID (301) | VEHICLE ID (302) | ACTION GOAL (303) | DEPENDED ACTION ID (304) |
|---|---|---|---|
| 251 | 200 (SECOND VEHICLE) | 261 | N/A |
| 252 | 2 (SUBJECT VEHICLE) | 262 | N/A |
| 253 | 200 (SECOND VEHICLE) | 263 | 252 |
| 254 | 2 (SUBJECT VEHICLE) | 264 | 253 |

MOBILE OBJECT PATH PREDICTION DATA GROUP 35

MOBILE OBJECT TRAJECTORY PREDICTION DATA GROUP 36

ELECTRONIC CONTROL APPARATUS AND PLANNING METHOD

TECHNICAL FIELD

The present invention relates to an electronic control apparatus and a planning method.

BACKGROUND ART

In recent years, technologies to generate a traveling trajectory of a subject vehicle while taking into consideration the traveling of other vehicles have been proposed in order to realize comfortable and safe driving assistance and automated driving of vehicles. Patent Document 1 discloses a path checking device used for a vehicle including a path generation unit that generates driving plans for the vehicle to travel by automated driving and a travel control unit that controls traveling of the vehicle in accordance with one of the generated driving plans, the path checking device including a safety distance setting unit that sets a minimum safety distance between a subject vehicle which is the vehicle for which the path checking device is used and an obstacle in order for the subject vehicle to avoid closely approaching the obstacle, an emergency control unit that determines whether or not the subject vehicle is traveling with the set safety distance and that executes emergency control for the subject vehicle that is different from control according to one of the driving plans when a distance between the subject vehicle and the obstacle is less than the safety distance, a caution zone setting unit that sets, when a moving obstacle is located ahead of the subject vehicle, a caution zone for the subject vehicle that is located away from the subject vehicle over the safety distance and that is between the moving obstacle and the subject vehicle, and a path selection unit that selects, from among the generated driving plans, a driving plan along which the subject vehicle will travel such that the moving obstacle does not come in the set caution zone.

PRIOR ART DOCUMENT

Patent Document

Patent Document 1: WO 2022/025087

SUMMARY OF THE INVENTION

Problem to be Solved by the Invention

There is room for consideration in the invention described in Patent Document 1 in terms of smooth passing-by.

Means for Solving the Problem

An electronic control apparatus according to a first aspect of the present invention is an electronic control apparatus mounted on a vehicle and includes an information acquiring section that acquires traveling environment information concerning a traveling environment around the vehicle, an immobility risk area estimating section that estimates an immobility restriction area on the basis of the traveling environment information, the immobility restriction area being an area where, if the vehicle is immobilized therein, the vehicle obstructs an action by a mobile object other than the vehicle, and being an area where immobility of the vehicle is restricted, and a traveling control planning section that plans traveling control of the vehicle on the basis of the estimated immobility restriction area.

A planning method according to a second aspect of the present invention is a planning method executed by an electronic control apparatus mounted on a vehicle and includes acquiring traveling environment information concerning a traveling environment around the vehicle, estimating an immobility restriction area on the basis of the traveling environment information, the immobility restriction area being an area where, if the vehicle is immobilized therein, the vehicle obstructs an action by a mobile object other than the vehicle, and being an area where immobility of the vehicle is restricted, and planning traveling control of the vehicle on the basis of the estimated immobility restriction area.

Advantages of the Invention

The present invention can realize smooth passing-by.

BRIEF DESCRIPTION OF THE DRAWINGS

FIG. 3 is a figure depicting a structural example of data stored in a coordinated action data group.

MODES FOR CARRYING OUT THE INVENTION

First Embodiment

Hereinafter, a first embodiment of an electronic control apparatus is explained with reference to FIG. 1 to FIG. 13.

(System Configuration)

Figure 1:
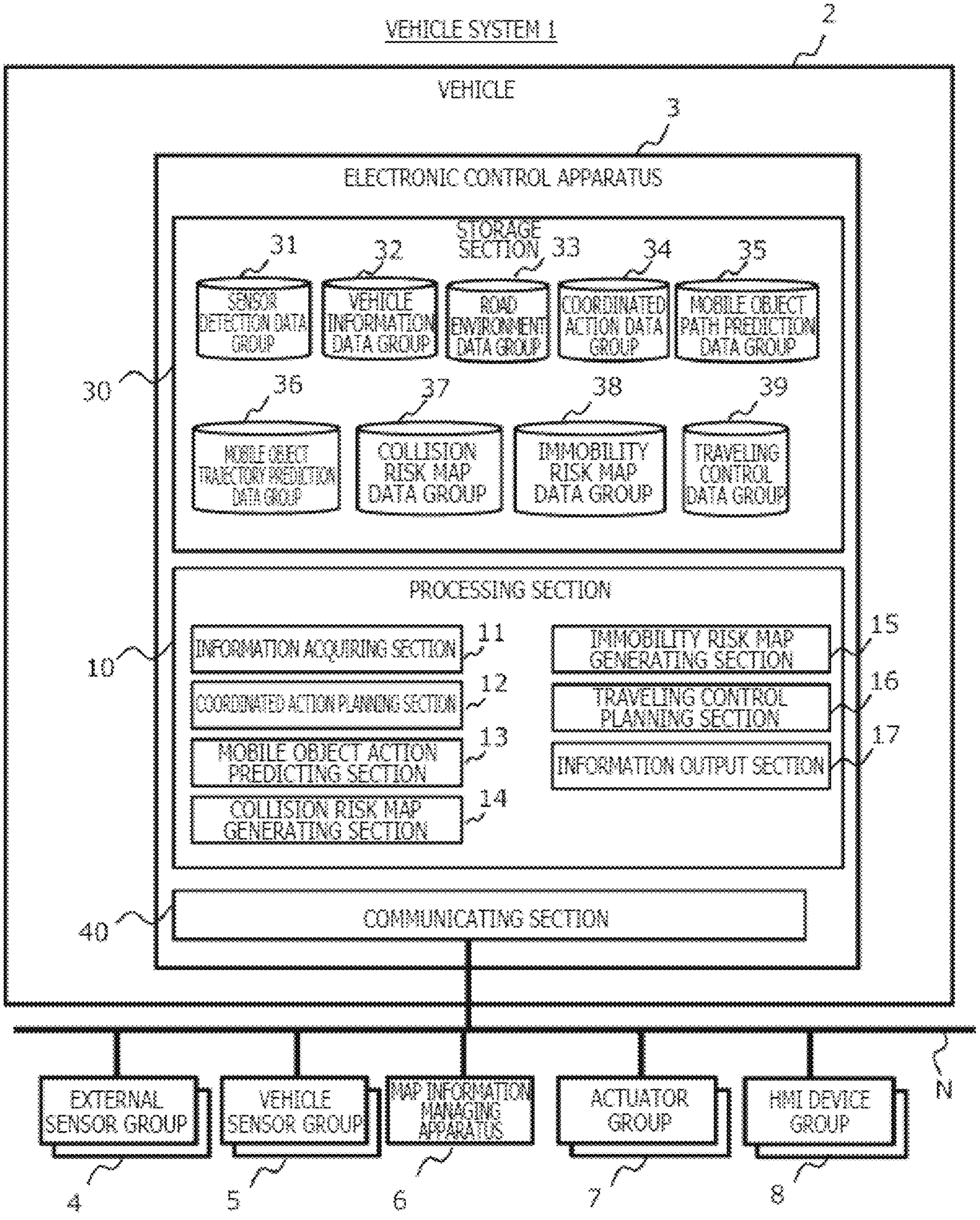
FIG. 1 is a functional block diagram depicting a configuration of a vehicle system in a first embodiment.

FIG. 1 is a functional block diagram depicting a configuration of a vehicle system 1 including an electronic control apparatus 3 according to an embodiment of the present invention. The vehicle system 1 is mounted on a vehicle 2. The vehicle system 1 performs appropriate driving assistance or traveling control by recognizing traveling roads around the vehicle 2 and the situation related to obstacles such as vehicles around the vehicle 2. The driving assistance also includes presentation of information to a driver driving the vehicle 2.

As depicted in FIG. 1, the vehicle system 1 includes the electronic control apparatus 3, an external sensor group 4, a vehicle sensor group 5, a map information managing apparatus 6, an actuator group 7, and an HMI device group 8. The electronic control apparatus 3, the external sensor group 4, the vehicle sensor group 5, the map information managing apparatus 6, the actuator group 7, and the HMI device group 8 are connected to one another by an in-vehicle network N. The in-vehicle network N may be a wired network, may be a wireless network, or may be a network in which wired networks and wireless networks are mixedly present. Note that the vehicle 2 is called the "subject vehicle" 2 hereinbelow in order to make a distinction between the vehicle 2 and other vehicles, in some cases.

The electronic control apparatus 3 is an ECU (Electronic Control Unit). On the basis of various types of input information provided from the external sensor group 4, the vehicle sensor group 5, the map information managing apparatus 6, and the like, the electronic control apparatus 3 generates traveling control information for driving assistance or automated driving of the vehicle 2, and outputs the traveling control information to the actuator group 7 and the HMI device group 8. The electronic control apparatus 3 has a processing section 10, a storage section 30, and a communicating section 40.

For example, the processing section 10 includes a CPU (Central Processing Unit) which is a central arithmetic processing device. It should be noted that the processing section 10 may include, in addition to the CPU, a GPU (Graphics Processing Unit), an FPGA (Field-Programmable Gate Array), an ASIC (application specific integrated circuit), or the like or may include any one of them. The processing section 10 has, as functions thereof, an information acquiring section 11, a coordinated action planning section 12, a mobile object action predicting section 13, a collision risk map generating section 14, an immobility risk map generating section 15, a traveling control planning section 16, and an information output section 17. For example, the processing section 10 may realize the functions by executing a predetermined operation program stored on the storage section 30, or some or all of the functions may be implemented in terms of hardware by such as an ASIC or the like.

The information acquiring section 11 acquires various types of information via the in-vehicle network N from another apparatus connected to the electronic control apparatus 3, and stores the various types of information on the storage section 30. For example, the information acquiring section 11 acquires a sensor detection data group 31 including information concerning stationary objects, mobile objects, and the like around the vehicle 2 detected by the external sensor group 4, a vehicle information data group 32 related to the motion, state, or the like of the vehicle 2 detected by the vehicle sensor group 5 or the like, a road environment data group 33 related to a traveling road of the vehicle 2 from the map information managing apparatus 6, and the like, and stores them on the storage section 30.

On the basis of the information such as the sensor detection data group 31, the vehicle information data group 32, and the road environment data group 33 acquired by the information acquiring section 11 and stored on the storage section 30, the coordinated action planning section 12 makes a plan as to whether or not a coordinated action by the vehicle 2 and a mobile object around the vehicle 2 is necessary and as to a procedure of the coordinated action, and stores the planned information as a coordinated action data group 34 on the storage section 30. The mobile object action predicting section 13 predicts future traveling paths and trajectories of mobile objects around the vehicle 2 included in the sensor detection data group 31. For this prediction, information such as the vehicle information data group 32, the road environment data group 33, and the coordinated action data group 34 is used. Then, the mobile object action predicting section 13 stores, on the storage section 30, the predicted traveling paths as a mobile object path prediction data group 35, and stores, on the storage section 30, the predicted trajectories as a mobile object trajectory prediction data group 36.

The collision risk map generating section 14 estimates areas with risks of collisions between the vehicle 2 and obstacles such as stationary objects and mobile objects included in the sensor detection data group 31, and the severities of the collisions (hereinbelow, called "collision risks"), and generates a collision risk map expressing the areas and the collision risks projected onto a two-dimensional map. For the generation of the risk map, the collision risk map generating section 14 uses the sensor detection data group 31, the vehicle information data group 32, and the mobile object path prediction data group 35. Then, the collision risk map generating section 14 stores, on the storage section 30, the generated collision risk map as a collision risk map data group 37. Hereinafter, the collision risk map generating section 14 is also called a "collision risk area estimating section."

Regarding a mobile object designated as a coordinated-action subject in the coordinated action data group 34, the immobility risk map generating section 15 estimates an immobility restriction area which is an area where, if the vehicle 2 is immobilized therein, the vehicle 2 obstructs the action by the mobile object, and the severity of the obstruction (hereinbelow, called an "immobility risk"). For this estimation, a predicted path of the mobile object obtained from the mobile object path prediction data group 35 is used. On the basis of estimation results, the immobility risk map generating section 15 generates an immobility risk map expressing the immobility risk that is projected onto a two-dimensional map, and stores the immobility risk map as an immobility risk map data group 38 on the storage section 30. Note that "immobility" means staying at a location or in an area for a predetermined period of time or longer, and a temporary stop or a low speed movement corresponds to "immobility." Hereinafter, the immobility risk map generating section 15 is also called an "immobility restriction area estimating section."

On the basis of the vehicle information data group 32, the road environment data group 33, the coordinated action data group 34, the collision risk map data group 37, the immobility risk map data group 38, and the like, the traveling control planning section 16 plans a trajectory along which the vehicle 2 should travel, and decides a control command value to be output to the actuator group 7 for following the planned trajectory. In a case where the vehicle 2 needs to perform a coordinated action with a mobile object around the vehicle 2, an appropriate waiting position/posture in the next action by the vehicle 2 is identified on the basis of the coordinated action data group 34 and the immobility risk map data group 38, and a path and a trajectory for reaching the waiting position/posture are planned. The generated planned path and planned trajectory of the vehicle 2, the control command value to be output to the actuator group 7, and the like are stored as a traveling control data group 39 on the storage section 30.

The information output section 17 outputs various types of information to another apparatus connected to the electronic control apparatus 3, via the in-vehicle network N. For example, the electronic control apparatus 3 outputs, to the actuator group 7, the control command value decided by the traveling control planning section 16, and controls the traveling of the vehicle 2. In addition, for example, the electronic control apparatus 3 outputs, to the HMI device group 8, the collision risk map generated by the collision risk map generating section 14, the immobility risk map generated by the immobility risk map generating section 15, the planned path and planned trajectory generated by the traveling control planning section 16, and the like. The electronic control apparatus 3 thus presents, to an occupant, information as to how the vehicle system 1 is interpreting the traveling environment around the vehicle 2 and what type of traveling the vehicle system 1 is planning.

For example, the storage section 30 includes a storage device such as a hard disk drive, a flash memory, or a ROM (Read Only Memory) or a memory such as a RAM. The storage section 30 stores programs to be processed by the processing section 10, data groups necessary for the processing, and the like. In addition, as a main storage to be used when the processing section 10 executes the programs, the storage section 30 is used also for the use of temporary storage of data necessary for computation of the programs. In the present embodiment, as information for realizing functions of the electronic control apparatus 3, the sensor detection data group 31, the vehicle information data group 32, the road environment data group 33, the coordinated action data group 34, the mobile object path prediction data group 35, the mobile object trajectory prediction data group 36, the collision risk map data group 37, the immobility risk map data group 38, the traveling control data group 39, and the like are stored.

The sensor detection data group 31 is a set of pieces of data related to information obtained through detection by the external sensor group 4. For example, the detected information is information concerning environmental elements such as stationary objects or mobile objects each identified on the basis of information obtained by sensing by the external sensor group 4. The vehicle information data group 32 is a set of pieces of data related to the motion, state, and the like of the vehicle 2. The vehicle information data group 32 includes vehicle information detected by the vehicle sensor group 5 and the like and acquired by the information acquiring section 11, and the like. For example, the vehicle information includes information such as the position, traveling speed, steering angle, accelerator operation amount, and brake operation amount of the vehicle 2.

The road environment data group 33 is a set of pieces of data related to traveling roads around the vehicle 2 acquired from the map information managing apparatus 6 or the like. For example, the data related to traveling roads includes information concerning the shape and attributes (advancing direction, speed limit, traveling regulations, etc.) of a road where the vehicle 2 is traveling and lanes included in the road, and the like. The coordinated action data group 34 is a map expressing the state and procedure of a coordinated action by the vehicle 2 and a mobile object around the vehicle 2.

The mobile object path prediction data group 35 is a set of pieces of data related to future predicted paths of mobile objects. The mobile object trajectory prediction data group 36 is a set of pieces of data related to future predicted trajectories of mobile objects. "Paths" do not include temporal concepts and express spatial information as to at which locations on road surfaces mobile objects travel in what types of posture. In contrast, "trajectories" include temporal concepts in addition to paths and express information as to when and at which locations mobile objects travel in what types of posture. That is, since "trajectories" involve temporal constraints, the "trajectories" express information concerning a predetermined time range (e.g., concerning a future five-second range).

The collision risk map data group 37 is a map expressing locations with risks of collisions with obstacles such as stationary objects and mobile objects around the vehicle 2, and the severities of the collisions. For example, the collision risk map data group 37 is expressed by a grid map. The immobility risk map data group 38 is a map expressing areas around the vehicle 2 where, if the vehicle 2 is immobilized therein, the vehicle 2 obstructs the actions of mobile objects other than the vehicle 2, and the severities of the obstruction. The immobility risk map data group 38 is expressed by a grid map or the like, as with the collision risk map data group 37.

The traveling control data group 39 is a set of pieces of data related to plan information for controlling the traveling of the vehicle 2 generated by the traveling control planning section 16. For example, the traveling control data group 39 includes the planned trajectory of the vehicle 2, the control command value to be output to the actuator group 7, and the like. For example, the communicating section 40 includes a network card or the like conforming to a communication standard such as IEEE 802.3 or CAN (Controller Area Network). The communicating section 40 performs data transmission/reception to and from another apparatus in the vehicle system 1 on the basis of various protocols.

Note that, whereas the communicating section 40 and the processing section 10 are described separately in the present embodiment, some of processes performed by the communicating section 40 may be executed in the processing section 10. For example, in one possible configuration, a section corresponding to a hardware device in a communication process is positioned in the communicating section 40, and a device driver group, a communication protocol process, and the like other than the section are positioned in the processing section 10.

The external sensor group 4 is a set of apparatuses that detect the state around the vehicle 2. For example, the external sensor group 4 includes a camera apparatus, a millimeter wave radar, a LiDAR, a sonar, and the like. The external sensor group 4 detects environmental elements such as stationary objects and mobile objects in a predetermined range from the vehicle 2 and outputs the environmental elements to the in-vehicle network N. For example, "stationary objects" represent obstacles, such as buildings and road edges, that cannot move from their locations. "Mobile objects" represent obstacles, such as vehicles other than the vehicle 2, pedestrians, and fallen objects on roads, that can move from their locations. Hence, even in a case where the obstacles that can move are stationary, they are called "mobile objects."

The vehicle sensor group 5 is a set of apparatuses that detect various states of the vehicle 2. For example, the respective vehicle sensors detect positional information, the traveling speed, the steering angle, the accelerator operation amount, the brake operation amount, or the like of the vehicle 2 and outputs it to the in-vehicle network N. The map information managing apparatus 6 is an apparatus that manages and provides digital map information concerning an area around the vehicle 2. For example, the map information managing apparatus 6 includes a navigation device or the like. For example, the map information managing apparatus 6 includes digital road map data of a predetermined region including an area around the vehicle 2, and is configured to identify the current position of the vehicle 2 on a map, i.e., a road and a lane where the vehicle 2 is traveling, on the basis of the positional information or the like concerning the vehicle 2 output from the vehicle sensor group 5. In addition, the map information managing apparatus 6 outputs, to the in-vehicle network N, map data of the identified current position of the vehicle 2 and an area around the current position.

The actuator group 7 is a device group that controls control elements such as the steering wheel, the brake, and the accelerator that decide the motion of the vehicle. The actuator group 7 controls the motion of the vehicle on the basis of information concerning operation of the steering wheel, the brake pedal, the accelerator pedal, and the like by a driver and the control information output from the electronic control apparatus 3. The HMI device group 8 is a device group used for inputting information from a driver or an occupant to the vehicle system 1 and for notifying information from the vehicle system 1 to a driver or an occupant. The HMI device group 8 includes a display, a speaker, a vibrator, a switch, and the like.

Figure 2:
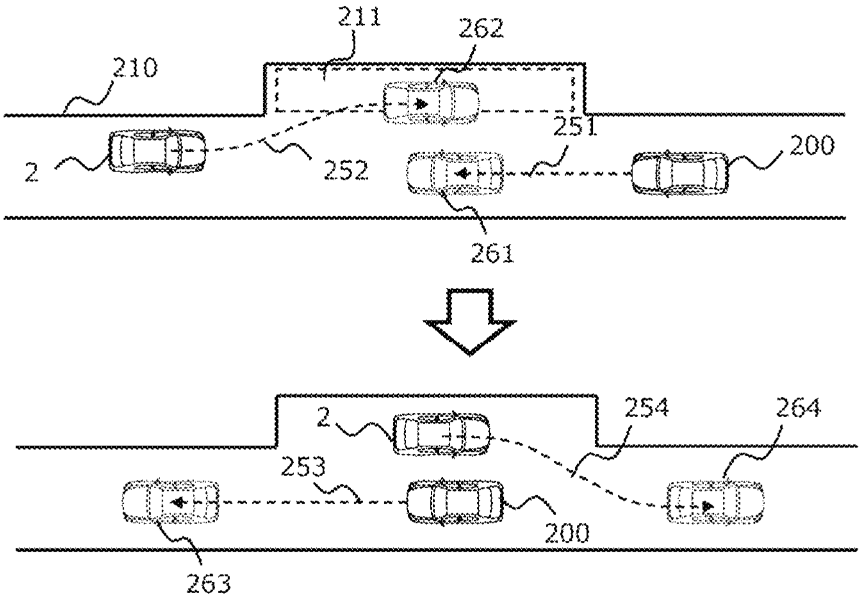
FIG. 2 is a figure depicting an example of a traveling scene.

FIG. 2 is a figure depicting an example of a traveling scene for operation explanation of the present embodiment. FIG. 2 is divided vertically, and, as time elapses, the traveling scene changes from the one in the top diagram of FIG. 2 to the one in the bottom diagram of FIG. 2. In the traveling scene in FIG. 2, there is an evacuation area 211 with a partially widened road width in a narrow road 210 where vehicles cannot pass by each other. In this road environment, the subject vehicle 2 is attempting to pass by a second vehicle 200. The top diagram of FIG. 2 depicts an action 252 by the subject vehicle 2 to evacuate toward an action goal 262 in the evacuation area 211. The top diagram of FIG. 2 depicts an action 251 by the second vehicle 200 near the subject vehicle 2 to wait at an action goal 261 so as not to obstruct the action by the subject vehicle 2 to evacuate to the evacuation area 211.

Note that action goals are tentatively set as criteria of target positions/postures of relevant action steps in order to express an action procedure in a coordinated action, and are different from actual target positions/postures in a traveling control plan or the actual behavior of the second vehicle 200. In addition, "waiting" means a state where a vehicle is at a predetermined speed or lower, and also includes not only a state where the speed is zero but also a state where the speed is a very low speed such as a speed which is approximately equal to a creep speed.

The bottom diagram of FIG. 2 depicts actions implemented after the actions in the top diagram have been completed. When the subject vehicle 2 reaches the action goal 262 in the evacuation area 211, the second vehicle 200 proceeds toward an action goal 263 (action 253) since the subject vehicle 2 and the second vehicle 200 can pass by in this state. Then, the subject vehicle 2 proceeds toward an action goal 264 (action 254) after the second vehicle 200 is no longer nearby, and the coordinated action related to passing-by is completed. In this manner, a coordinated action is expressed by a combination of mutually-dependent action steps between the subject vehicle 2 and another mobile object. The action steps are characterized by criteria of target positions/postures at the destinations of the action steps, which are called action goals.

Note that, not only in the example in FIG. 2, but in the present embodiment, the subject vehicle 2 and the second vehicle 200 do not perform special mutual communication, but each of the subject vehicle 2 and the second vehicle 200 predicts operations to be performed by the other. If the prediction is wrong, smooth passing-by like the one depicted in FIG. 2 cannot be realized, but operations in the present embodiment are explained on the premise that each can correctly predict actions by the other. Note that the subject vehicle 2 and the second vehicle 200 may communicate, and each may transmit information concerning an operation that it will perform, to the other.

FIG. 3 is a figure depicting a structural example of data stored in the coordinated action data group 34. Information concerning a procedure of coordinated actions like the one explained with reference to FIG. 2 is stored in the coordinated action data group 34. The coordinated action data group 34 includes a plurality of records, and each record includes an action ID 301, a vehicle ID 302, an action goal 303, a depended action ID 304, and the like. The action ID 301 is an identifier of the action step. Hereinafter, in a case where there is an expression "action XXX," this means that the action ID 301 is "XXX."

The vehicle ID 302 is information concerning an identifier representing the subject of operation of the action step. The subject of operation is the subject vehicle 2 or a mobile object which is the other party in a coordinated action by the subject vehicle 2, and an ID for identifying the subject vehicle 2 or the mobile object is used. The action goal 303 is information concerning the destination of the action step and is an action goal depicted in FIG. 2. Note that the expression forms of action goals are not particularly restricted. Action goals may express the positional coordinates of destinations, may express areas, or may include also expressions concerning postures.

The depended action ID 304 is an action ID of an action step on which the relevant action step is dependent. In a case where the depended action ID 304 is designated, this means that the designated action step needs to have been completed before the relevant action step. For example, since there are no action steps on which the actions 251 and 252 are dependent, the depended action IDs 304 are expressed as "N/A," and since the actions 253 and 254 are dependent on the actions 252 and 253, "252" and "253" are written as the depended action IDs 304.

Figure 4:
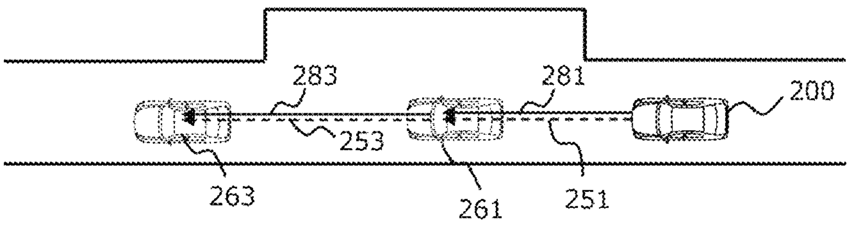
FIG. 4 is a figure depicting an example of a mobile object path prediction data group and a mobile object trajectory prediction data group in the traveling scene in FIG. 2.
Figure 4:
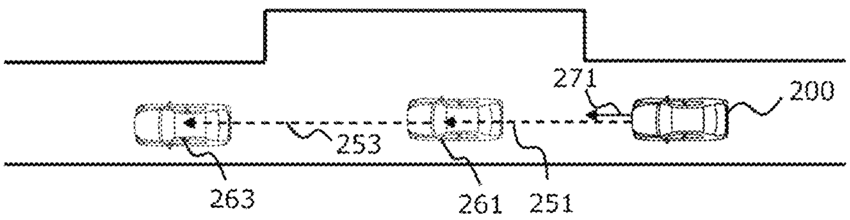

FIG. 4 is a figure depicting an example of data stored as the mobile object path prediction data group 35 and the mobile object trajectory prediction data group 36, regarding the actions 251 and 253 by the second vehicle 200 in the traveling scene in FIG. 2. The mobile object path prediction data group 35 is a set of pieces of data related to future predicted paths of mobile objects. A predicted path of a mobile object as a coordinated-action subject is generated for each coordinated-action step. Predicted paths 281 and 283 depicted in FIG. 4 are predicted paths related to the actions 251 and 253 by the second vehicle 200, respectively. The mobile object trajectory prediction data group 36 is a set of pieces of data related to future predicted trajectories of mobile objects. FIG. 4 depicts a predicted trajectory 271 of the second vehicle 200. Since the predicted trajectory is generated not for each coordinated-action step but for a predetermined future time range, FIG. 4 depicts a trajectory for a predetermined time range in the action 251.

Figure 5:
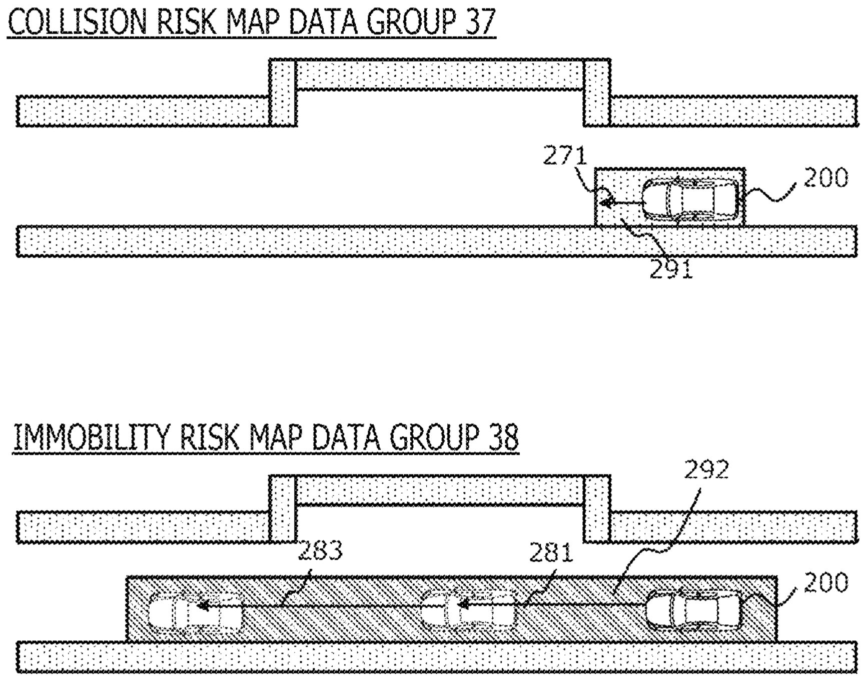
FIG. 5 is a figure depicting an example of a collision risk map data group and an immobility risk map data group in the traveling scene in FIG. 2.

FIG. 5 is a figure depicting an example of the collision risk map data group 37 and the immobility risk map data group 38 in the traveling scene in FIG. 2. Specifically, the top diagram of FIG. 5 depicts an example of the collision risk map data group 37, and the bottom diagram of FIG. 5 depicts an example of the immobility risk map data group 38.

A collision risk map is formed by mapping locations with risks of collisions of the vehicle 2 with obstacles such as stationary objects and mobile objects around the vehicle 2, and mapping the severities of the collisions. In the example depicted in the top diagram of FIG. 5, a risk of a collision between a road boundary (road edge), which is a stationary object, and the second vehicle 200, which is a mobile object, is represented by hatching with dots as denoted by a reference symbol 291. Examples of the expression form of the collision risk map include a grid map. In this grid map, a collision risk value at each position with coordinate values (x, y) represented by variables x and y in a predetermined area specified in an orthogonal coordinate system centered on the current position of the vehicle 2 is stored.

The immobility risk map is formed by mapping an area where, if the vehicle 2 is immobilized therein, the vehicle 2 obstructs an action by the mobile object, and mapping an immobility risk which is the severity of the obstruction. In the example depicted in FIG. 5, an immobility risk area 292 where an action by the second vehicle 200, which is a mobile object as a coordinated-action subject, is obstructed is expressed by hatching with diagonal lines. In addition, immobility risks of untravellable areas may also be arranged in the immobility risk map. Since the immobility risk map is used for determining appropriate waiting positions/postures of the vehicle 2, preferably, risks are arranged not only in areas where an action by a subject mobile object will be obstructed but also in inherently untravellable areas, in order to search for an area where the vehicle 2 is allowed to be immobilized.

Note that, since whether or not there is a collision risk or there is an immobility risk is represented by whether or not there is hatching in the example depicted in the present embodiment, the severities of the risks are not expressed in the figure. The severities of the risks may be represented by two values representing whether or not there is a risk, or may be represented by consecutive values such as 0 to 100. Hereinafter, an area with a collision risk is also called a "collision risk area," and an area with an immobility risk is also called an "immobility risk area." Furthermore, a collision risk area and an immobility risk area are also called a "risk area" collectively.

In the example depicted in the bottom diagram of FIG. 5, as in the collision risk map, an immobility risk is arranged also in road edges, which are stationary objects, i.e., in areas represented by hatching with dots. It should be noted that, since an immobility risk of an untravellable area has a meaning which is different from the meaning of an immobility risk in its original sense, it is desirable that a distinction can be made between an immobility risk in the original sense and an immobility risk of an untravellable area on the immobility risk map. In FIG. 5, the immobility risk in the original sense and the immobility risk of the untravellable area are distinguished from each other by the severities of the immobility risks. The untravellable area is expressed by hatching with dots, and the immobility risk area in the original sense is expressed by hatching with diagonal lines. For example, the risk severities may be expressed by discrete levels such as three levels, namely, high, medium, and low levels, or may be expressed by consecutive numerical values.

On the basis of the information acquired from each of the external sensor group 4, the vehicle sensor group 5, the map information managing apparatus 6, and the like, the electronic control apparatus 3 determines and maps risks of collisions with obstacles such as stationary objects and mobile objects present around the vehicle 2, determines and maps immobility risks, and generates and outputs traveling control information concerning the vehicle 2. The actuator group 7 controls each actuator of the vehicle 2 according to the traveling control information mentioned before. Traveling control of the vehicle 2 is thus realized. In addition, the electronic control apparatus 3 generates HMI information as information that should be notified to a driver or an occupant in traveling control of the vehicle 2, and outputs the HMI information to the HMI device group 8. It is thus possible to cause the driver to recognize risks in traveling, prompt the driver to drive safely, and assist an action coordinated with another vehicle, and also to present the state of the vehicle system 1 during automatic traveling to the driver or the occupant.

Figure 6:
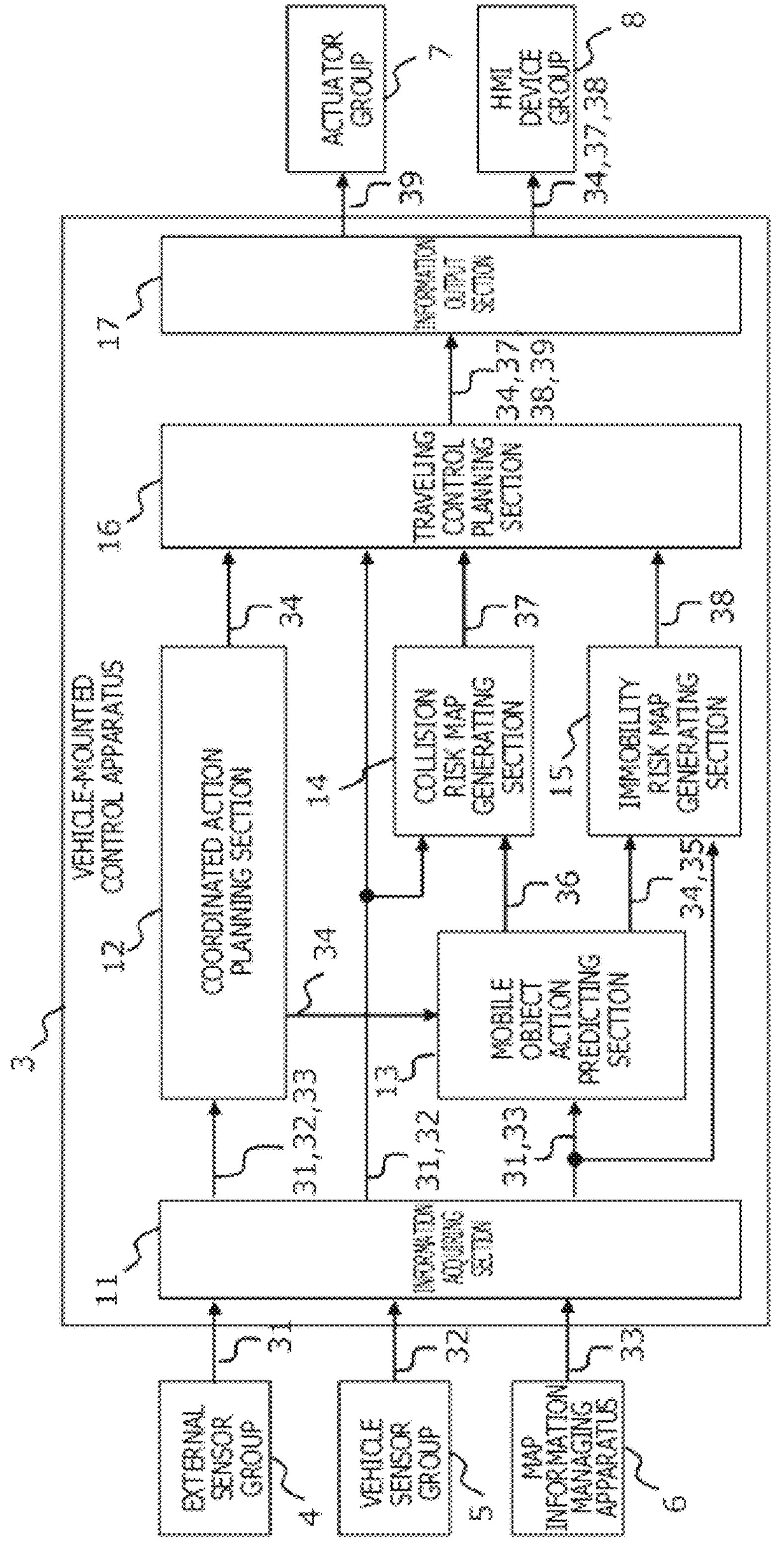
FIG. 6 is a figure depicting a correlation among functions realized by an electronic control apparatus.

FIG. 6 is a figure depicting a correlation among functions realized by the electronic control apparatus 3. The electronic control apparatus 3 is configured such that processes performed by the information acquiring section 11, the coordinated action planning section 12, the mobile object action predicting section 13, the collision risk map generating section 14, the immobility risk map generating section 15, the traveling control planning section 16, and the information output section 17 depicted in FIG. 1 are executed in an appropriate sequence. For example, a series of processing is executed regularly after every 100 ms.

The information acquiring section 11 acquires necessary information from another apparatus via the in-vehicle network N and stores the information on the storage section 30. The information acquiring section 11 acquires the sensor detection data group 31 from the external sensor group 4, the vehicle information data group 32 from the vehicle sensor group 5, and the road environment data group 33 from the map information managing apparatus 6, and passes them to downstream processing sections.

On the basis of the sensor detection data group 31, the vehicle information data group 32, and the road environment data group 33 acquired from the information acquiring section 11, the coordinated action planning section 12 determines whether or not an action by the vehicle 2 coordinated with a mobile object around the vehicle 2 is necessary. In a case where it is determined that a coordinated action is necessary, the coordinated action planning section 12 decides and manages a procedure of the action coordinated with the subject mobile object. Then, the coordinated action planning section 12 outputs the coordinated action data group 34 related to the coordinated action procedure to each of the mobile object action predicting section 13 and the traveling control planning section 16. In a case where it is determined that a coordinated action is not necessary, the coordinated action planning section 12 may not perform a special process, or may output information to the effect that it is determined that a coordinated action is not necessary, to the HMI device group 8 via the information output section 17.

The mobile object action predicting section 13 predicts a path and a trajectory related to the mobile object around the vehicle 2 and generates the mobile object path prediction data group 35 and the mobile object trajectory prediction data group 36. For the generation of these, the mobile object action predicting section 13 uses the sensor detection data group 31 and the road environment data group 33 acquired from the information acquiring section 11 as well as the coordinated action data group 34 output from the coordinated action planning section 12. The mobile object path prediction data group 35 is output to the immobility risk map generating section 15 along with the coordinated action data group 34, and the mobile object trajectory prediction data group 36 is output to the collision risk map generating section 14.

On the basis of the vehicle information data group 32 and the mobile object trajectory prediction data group 36, regarding each obstacle included in the sensor detection data group 31, the collision risk map generating section 14 estimates areas with risks of collisions with the vehicle 2 and the severity of a collision risk of each area. Then, the collision risk map generating section 14 maps calculation results and generates the collision risk map data group 37. The generated collision risk map data group 37 is output to the traveling control planning section 16.

On the basis of the coordinated action data group 34 and the mobile object path prediction data group 35, the immobility risk map generating section 15 extracts predicted path information concerning the mobile object as the coordinated-action subject, and identifies an area where, if the vehicle 2 is immobilized therein, the vehicle 2 obstructs an action by the mobile object. In addition, the immobility risk map generating section 15 identifies an untravellable area on the basis of information such as traveling regulations included in the sensor detection data group 31 and the road environment data group 33. The immobility risk map generating section 15 combines these pieces of information to estimate areas with immobility risks and the severity of an immobility risk of each area, maps estimation results, and generates the immobility risk map data group 38. The generated immobility risk map data group 38 is output to the traveling control planning section 16.

On the basis of the coordinated action data group 34, the collision risk map data group 37, the immobility risk map data group 38, and the like, the traveling control planning section 16 plans a trajectory along which the vehicle 2 should travel, and generates a control command value or the like for following the trajectory. Then, the traveling control data group 39 including information such as the control command value and various types of input information used for information presentation at the HMI device group 8 are output to the information output section 17. On the basis of the traveling control data group 39, the information output section 17 outputs the control command value to the actuator group 7. In addition, on the basis of the coordinated action data group 34, the collision risk map data group 37, and the immobility risk map data group 38, the information output section 17 outputs information for the HMI device group 8 to present to an occupant.

Hereinafter, operations performed by the electronic control apparatus 3 are explained in detail using the traveling scene depicted in FIG. 2.

(Process Performed by Coordinated Action Planning Section 12)

Figure 7:
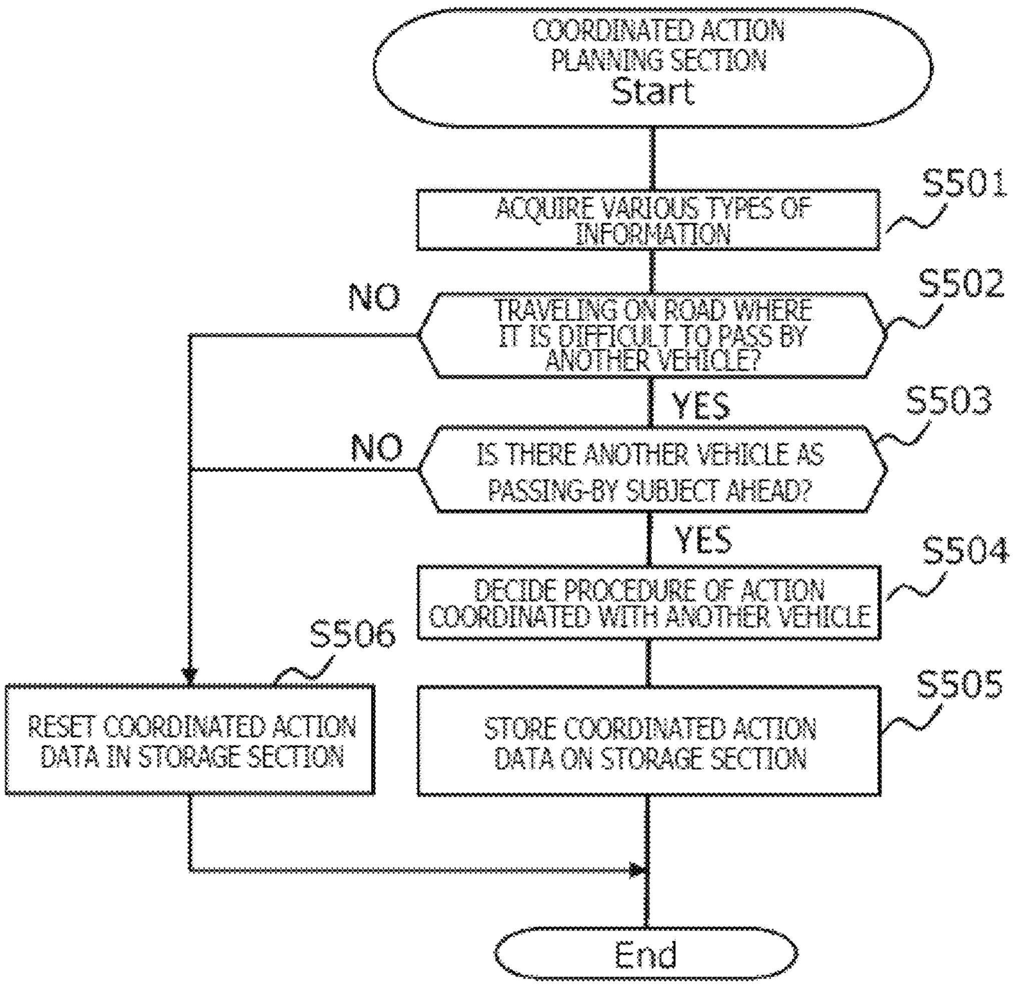
FIG. 7 is a flowchart depicting a process performed by a coordinated action planning section.

FIG. 7 is a flowchart depicting a process performed by the coordinated action planning section 12. First, at Step S501, the coordinated action planning section 12 acquires the sensor detection data group 31, the vehicle information data group 32, and the road environment data group 33, which are traveling environment information. Next, at Step S502, the coordinated action planning section 12 determines whether or not it is difficult to pass by another vehicle in the current traveling road environment. For example, the coordinated action planning section 12 determines whether it is difficult to pass by another vehicle, by using information such as the number of lanes and road width of the current road included in the road environment data group 33.

In a case where it is determined that it is not difficult to pass by another vehicle (NO at Step S502), the coordinated action planning section 12 determines that the current situation does not necessitate a coordinated action, resets the coordinated action data group 34 in the storage section at Step S506, and ends the process depicted in FIG. 7. In a case where it is determined that it is difficult to pass by another vehicle (YES at Step S502), the coordinated action planning section 12 determines whether or not there is another vehicle as a passing-by subject (oncoming car) ahead on the basis of the sensor detection data group 31 (Step S503).

In a case where it is determined that there are no other vehicles as passing-by subjects ahead (NO at Step S503), the coordinated action planning section 12 proceeds to Step S506 and ends the process depicted in FIG. 7. In a case where it is determined that there is another vehicle as a passing-by subject ahead (YES at Step S503), the coordinated action planning section 12 decides a coordinated action procedure for realizing passing-by with the other vehicle at Step S504, stores the coordinated action procedure as the coordinated action data group 34 on the storage section 30 at Step S505, and ends the process depicted in FIG. 7.

For example, the coordinated action procedure is specified with the positional relation of the location of a temporary evacuation area for passing-by. In the case of the scene in FIG. 2, the evacuation area 211 is positioned on the left side as seen in the advancing direction of the subject vehicle 2. Accordingly, the subject vehicle 2 is naturally the one to evacuate in a traveling environment with left-hand traffic. As a result, the coordinated action procedure as depicted in FIG. 2 and FIG. 3 is decided. Note that, as the subject vehicle 2 and the second vehicle 200 keep completing action steps in accordance with the coordinated action procedure, current subject action steps are updated. In that case, the action steps execution of which has been completed are removed from the coordinated action procedure.

(Process Performed by Mobile Object Action Predicting Section 13)

Figure 8:
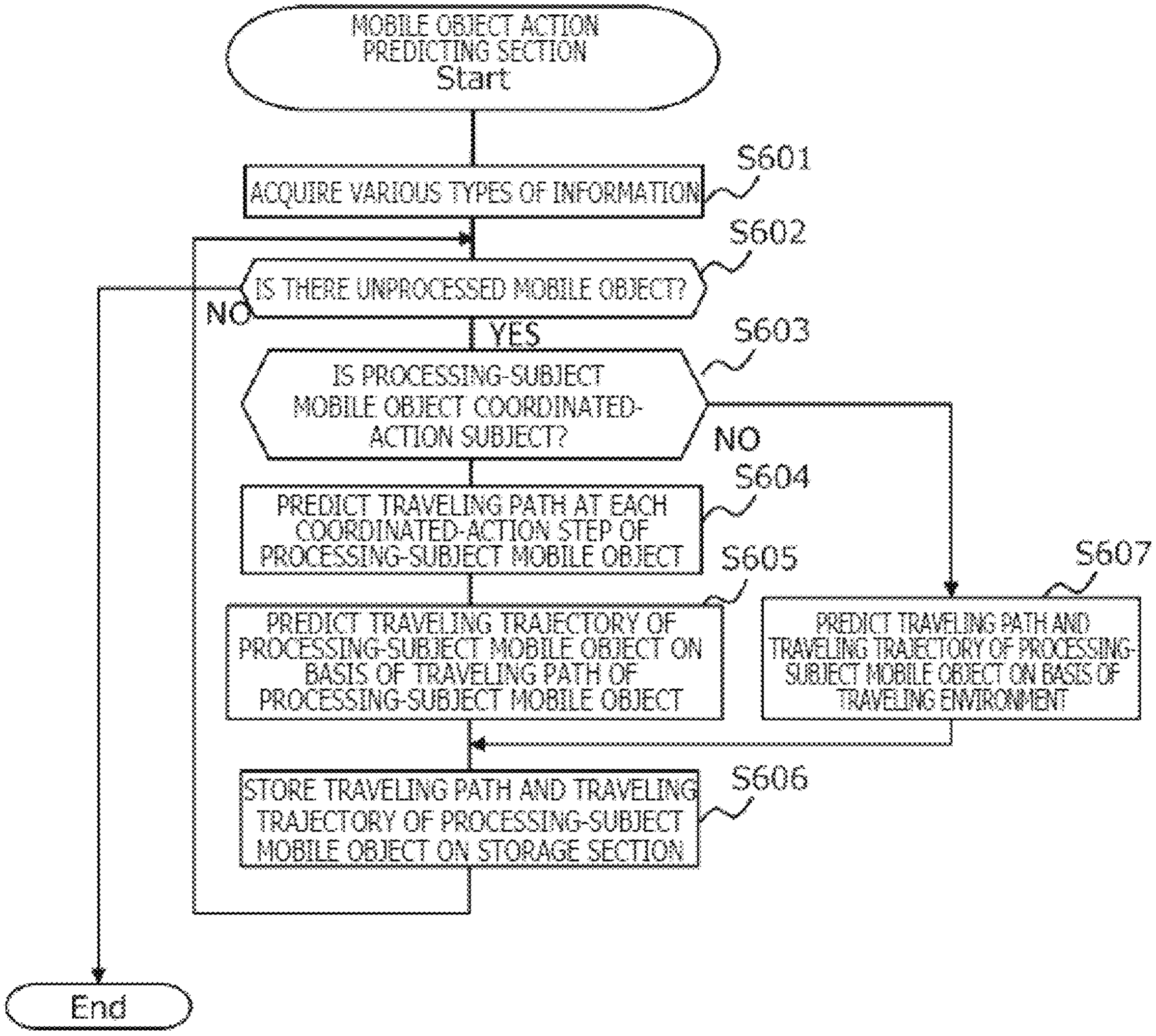
FIG. 8 is a flowchart depicting a process performed by a mobile object action predicting section.

FIG. 8 is a flowchart depicting a process performed by the mobile object action predicting section 13. First, at Step S601, the mobile object action predicting section 13 acquires the sensor detection data group 31, the road environment data group 33, and the coordinated action data group 34 and proceeds to Step S602. The mobile object action predicting section 13 sequentially sets, as a processing-subject mobile object, each of all mobile objects included in the sensor detection data group 31 and, at Step S602 to Step S607, predicts the traveling path and the traveling trajectory of the processing-subject mobile object.

At Step S602, the mobile object action predicting section 13 determines whether or not there is an unprocessed mobile object. In a case where it is determined that there are no unprocessed mobile objects (NO at Step S602), the mobile object action predicting section 13 ends the process depicted in FIG. 8. In a case where it is determined that there is an unprocessed mobile object, the mobile object action predicting section 13 proceeds to Step S603.

At Step S603, the mobile object action predicting section 13 determines whether or not the processing subject is designated as a coordinated-action subject in the coordinated action data group 34. In a case where it is determined that the processing-subject mobile object is designated as a coordinated-action subject, the mobile object action predicting section 13 proceeds to Step S604. In a case where it is determined that the processing-subject mobile object is not designated as a coordinated-action subject, the mobile object action predicting section 13 proceeds to Step S607. At Step S607, on the basis of information such as lanes and traffic regulations included in the road environment data group 33, the mobile object action predicting section 13 predicts the traveling path and the traveling trajectory of the processing-subject mobile object and proceeds to Step S606.

At Step S604, the mobile object action predicting section 13 predicts the traveling path at each coordinated-action step corresponding to the processing-subject mobile object in the coordinated action data group 34. A coordinated-action step corresponding to the processing-subject mobile object is determined on the basis of whether or not a vehicle ID depicted in FIG. 3 and the ID of the processing-subject mobile object match. In the case of a coordinated-action step which is the current subject of the processing-subject mobile object, a traveling path for the action goal 303 is predicted on the basis of the current state (position, posture, speed, etc.) of the processing-subject mobile object and the state of a stationary object or another mobile object (including the subject vehicle 2). In the case of a coordinated-action step which is not the current subject of the processing-subject mobile object, from the action goal 303 of a coordinated-action step that is planned to be implemented by the processing-subject mobile object before that, a traveling path for the action goal 303 of the relevant coordinated-action step is predicted similarly. In the example depicted in FIG. 4, the predicted path 281 for the action 251 which is a current subject coordinated-action step and the predicted path 283 for the action 253 which is the next subject coordinated-action step are generated.

Next, at Step S605, on the basis of the predicted path at each coordinated-action step generated at Step S604, the mobile object action predicting section 13 predicts the traveling trajectory of the processing-subject mobile object, and proceeds to Step S606. The prediction of the traveling trajectory is performed for a specified time range, unlike the traveling path. Accordingly, using the current subject coordinated-action step as a reference, the position/posture, speed, and the like of the predetermined time range are estimated from the current state (position, posture, speed, etc.) of the processing-subject mobile object. If the current coordinated-action step is to be completed in a predetermined period of time, the prediction is taken over to the next coordinated-action step. In the example depicted in FIG. 4, it is assumed that the second vehicle 200 is at a very low speed, and the predicted trajectory 271 is generated.

At Step S606, the mobile object action predicting section 13 stores, on the storage section 30, the traveling path/traveling trajectory of the processing-subject mobile object predicted at Step S605 or Step S607 as the mobile object path prediction data group 35 and the mobile object trajectory prediction data group 36, respectively. Then, the mobile object action predicting section 13 returns to Step S602, and the process is repeated until there are no more unprocessed mobile objects.

(Process Performed by Collision Risk Map Generating Section 14)

Figure 9:
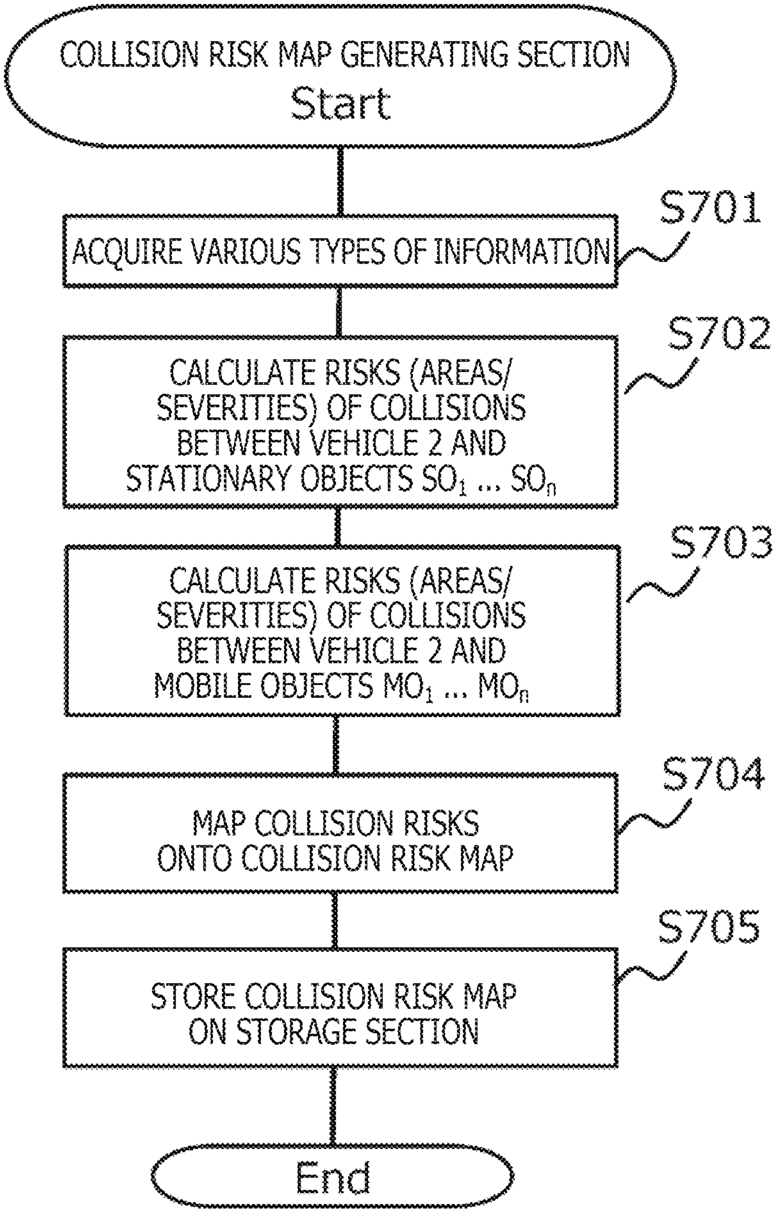
FIG. 9 is a flowchart depicting a process performed by a collision risk map generating section.

FIG. 9 is a flowchart depicting a process performed by the collision risk map generating section 14. First, at Step S701, the collision risk map generating section 14 acquires the sensor detection data group 31, the vehicle information data group 32, and the mobile object trajectory prediction data group 36. Next, at Step S702, regarding each stationary object included in the sensor detection data group 31, the collision risk map generating section 14 calculates an area with a collision risk and the severity of the collision risk. Since the stationary object does not move, the area where there is the relevant stationary object is regarded as an area with a collision risk as it is, independently of the lapse of time.

Then, at Step S703, regarding each mobile object included in the sensor detection data group 31, the collision risk map generating section 14 calculates areas with collision risks and the severities of the collision risks. Since there is a possibility that the mobile object moves, it is desirable that areas with collision risks be determined taking into consideration also the influence of movement along with the lapse of time, on the basis of the mobile object trajectory prediction data group 36. For example, the probability distribution for each moving direction of the mobile object or the probability distribution of each movement speed of the mobile object may be calculated to calculate the severities of collision risks. At subsequent Step S704, the collision risk map generating section 14 maps, onto a collision risk map, the collision risks around the vehicle 2 that are calculated at Step S702 and Step S703. As mentioned before, the top diagram of FIG. 5 depicts an example of the collision risk map in the scene depicted in the top diagram of FIG. 2. The road edge portions, which are stationary objects, and a predicted trajectory area of the second vehicle 200, which is a mobile object, are expressed as collision risks. At subsequent Step S705, the collision risk map generating section 14 stores, on the storage section 30, the created collision risk map as the collision risk map data group 37, and ends the process depicted in FIG. 9.

(Process Performed by Immobility Risk Map Generating Section 15)

Figure 10:
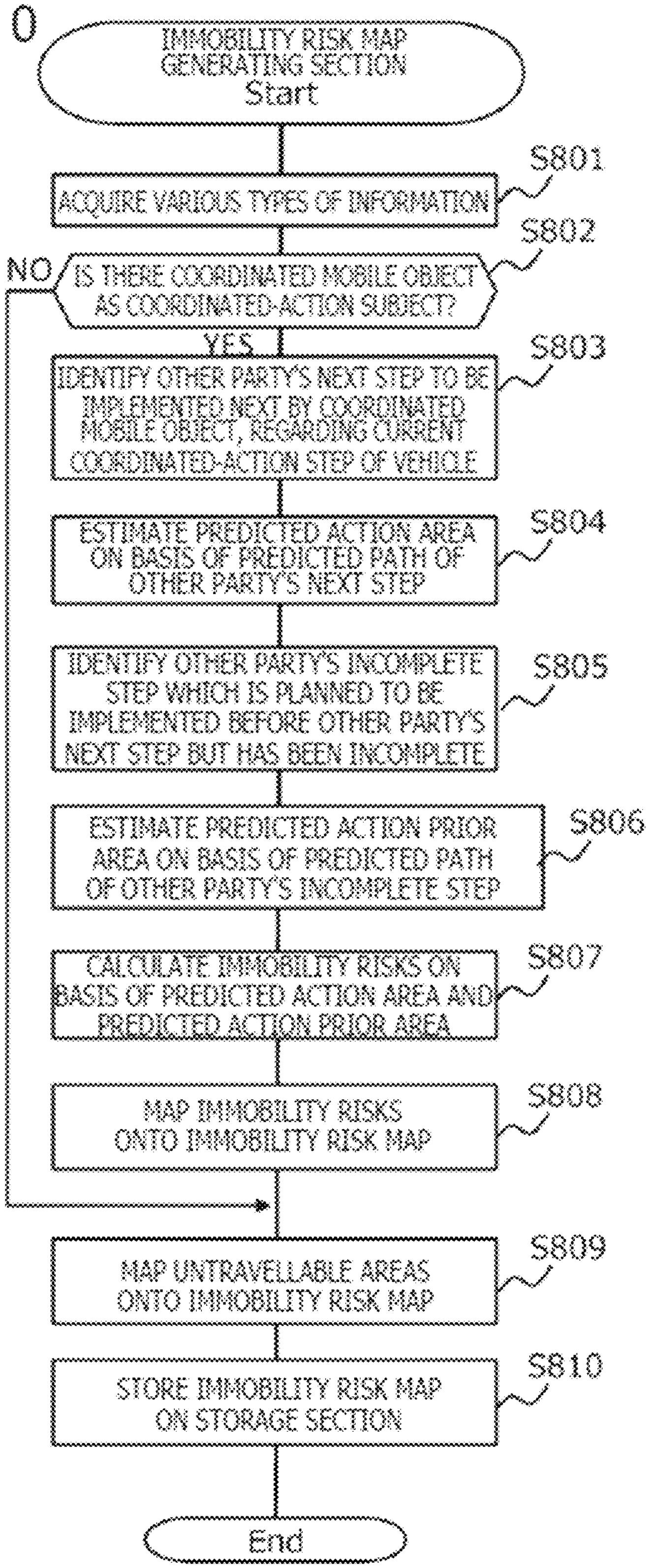
FIG. 10 is a flowchart depicting a process performed by an immobility risk map generating section.

FIG. 10 is a flowchart depicting a process performed by the immobility risk map generating section 15. First, at Step S801, the immobility risk map generating section 15 acquires the sensor detection data group 31, the road environment data group 33, the coordinated action data group 34, and the mobile object path prediction data group 35. At subsequent Step S802, by referring to the coordinated action data group 34, the immobility risk map generating section 15 determines whether or not there is a mobile object as a coordinated-action subject (hereinafter, called a "coordinated mobile object"). In a case where it is determined that there are no coordinated mobile objects, the immobility risk map generating section 15 proceeds to Step S809. In a case where it is determined that there is a coordinated mobile object, the immobility risk map generating section 15 calculates and maps immobility risks of the coordinated mobile object at Step S803 to Step S808 as explained next.

At Step S803, by referring to the coordinated action data group 34, regarding the current subject coordinated-action step of the vehicle 2, the immobility risk map generating section 15 identifies a coordinated-action step to be implemented next by the coordinated mobile object (hereinafter, called an "other party's next step"). For example, in a case where the current subject coordinated-action step of the subject vehicle 2 is the action 252 in FIG. 3, the other party's next step is the action 253. The other party's next step can be determined by searching for an entry whose depended action ID 304 represents the coordinated-action step of the subject vehicle 2.

Next, at Step S804, by referring to the mobile object path prediction data group 35, the immobility risk map generating section 15 extracts a predicted path corresponding to the other party's next step, and estimates a predicted action area which is an area to which the coordinated mobile object moves at the other party's next step. For example, the predicted action area is obtained by calculating an area where the coordinated mobile object passes through following the predicted path. For example, the shape of the coordinated mobile object is obtained by referring to recognition results of the external sensor group 4 included in the sensor detection data group 31. Since recognition results of the external sensor group 4 and the predicted path include errors, it is desirable that the predicted action area be set taking into consideration margins therefor.

Next, at Step S805, the immobility risk map generating section 15 identifies the other party's incomplete step of the mobile object MO that has been planned to be implemented before the other party's next step but has been incomplete. For example, in FIG. 3, in a case where the other party's next step is the action 253, the action 251 is the other party's incomplete step. At subsequent Step S806, the immobility risk map generating section 15 estimates a predicted action prior area, which is an area to which the coordinated mobile object moves at the other party's incomplete step, by a procedure similar to that of Step S804.

At subsequent Step S807, on the basis of the predicted action area and the predicted action prior area estimated at Step S804 and Step S806, the immobility risk map generating section 15 calculates areas with immobility risks and the severities of the immobility risks, and maps results thereof onto an immobility risk map at Step S808. For example, immobility risks are set at a uniform severity for the areas of the predicted action area and the predicted action prior area. Alternatively, for example, a relatively low immobility risk may be set for a range within a predetermined distance for the areas of the predicted action area and the predicted action prior area. An implementation example in a case where severities are given to immobility risks is mentioned later with reference to FIG. 14 and FIG. 15.

Note that the reason why predicted paths of the other party's next step to be implemented by the coordinated mobile object next to the current coordinated-action step of the subject vehicle 2 and of the other party's incomplete step prior to it are set as immobility risks is as follows. That is, this is because the state of the waiting position and posture of the subject vehicle 2 at the end of the current coordinated-action step of the subject vehicle 2 have direct influence. If the waiting position and posture of the subject vehicle 2 undesirably obstruct the coordinated-action step of the coordinated mobile object, the coordinated mobile object cannot move, and a deadlocked state occurs.

When mapping of immobility risks for the coordinated mobile object is completed by the processes performed at Step S803 to Step S808, the immobility risk map generating section 15 maps untravellable areas onto the immobility risk map at Step S809. Then, at subsequent Step S810, the immobility risk map generating section 15 stores, on the storage section 30, the immobility risk map as the immobility risk map data group 38. For example, the untravellable areas are areas where there are stationary objects, or traveling prohibited areas indicated by the road environment data group 33 or the like. Risk severities at the time of mapping of the untravellable areas are recorded such that distinctions can be made between them and the immobility risks for the coordinated mobile object.

Note that, since it is possible to refer to information concerning the untravellable areas by using the collision risk map in combination, it is sufficient if at least the immobility risks are mapped on the immobility risk map. The bottom diagram of FIG. 5 mentioned before depicts an example of the immobility risk map in the scene in the top diagram of FIG. 2. In the bottom diagram of FIG. 5, a predicted action area corresponding to the action 251 (predicted path 281) and the action 253 (predicted path 283) by the second vehicle 200 is expressed as the immobility risk area 292.

(Process Performed by Traveling Control Planning Section 16)

Figure 11:
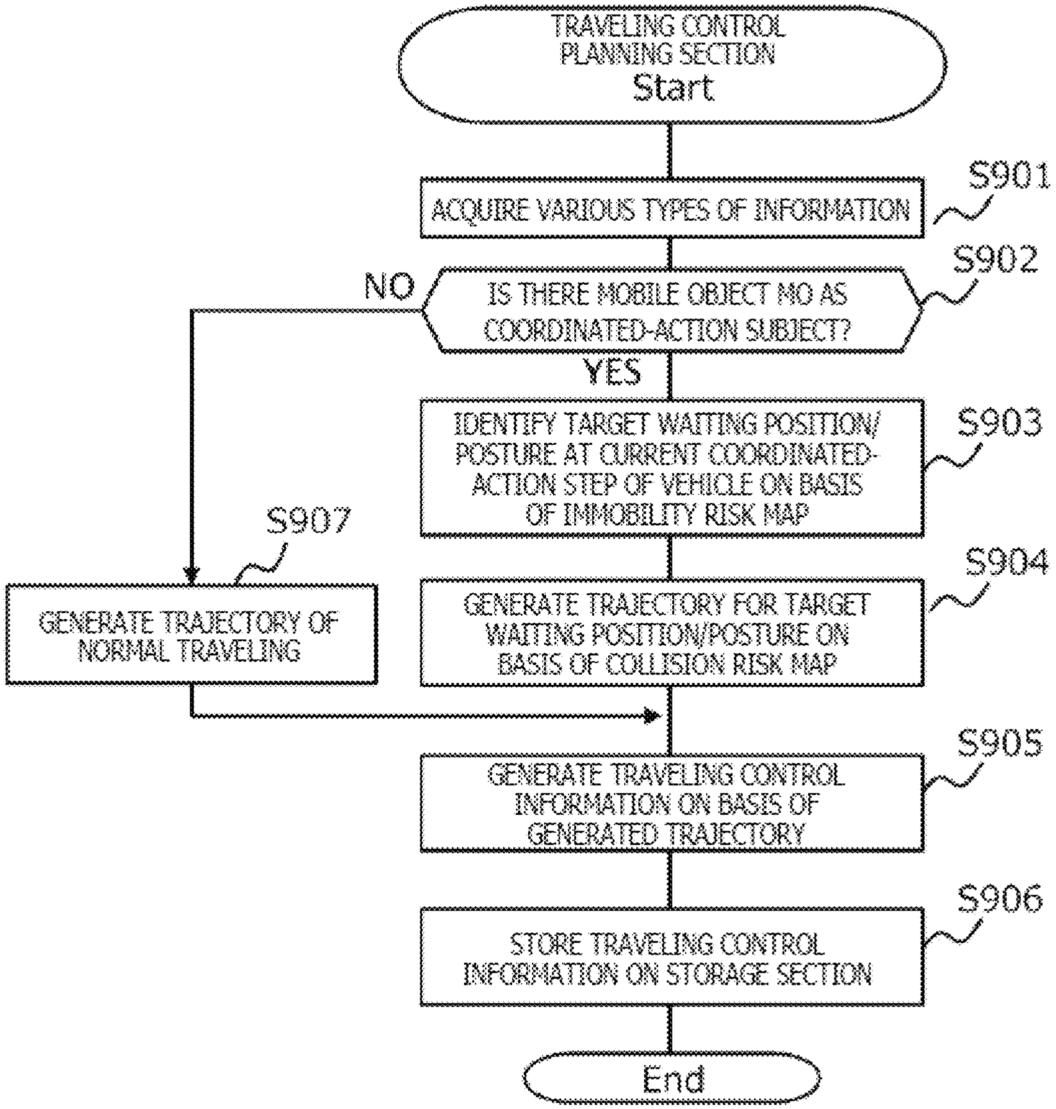
FIG. 11 is a flowchart depicting a process performed by a traveling control planning section.

FIG. 11 is a flowchart depicting a process performed by the traveling control planning section 16. First, at Step S901, the traveling control planning section 16 acquires the sensor detection data group 31, the vehicle information data group 32, the coordinated action data group 34, the collision risk map data group 37, the immobility risk map data group 38, and the like. Next, at Step S902, by referring to the coordinated action data group 34, the traveling control planning section 16 determines whether or not there is a coordinated mobile object, which is a mobile object as a coordinated-action subject. In a case where it is determined that there are no coordinated mobile objects, the traveling control planning section 16 proceeds to Step step S907. In a case where it is determined that there is a coordinated mobile object, the traveling control planning section 16 proceeds to Step S903.

At Step S903, by referring to the immobility risk map included in the immobility risk map data group 38, the traveling control planning section 16 first identifies a target waiting position/posture at the current coordinated-action step of the subject vehicle 2. Then, at Step S904, by referring to the collision risk map included in the collision risk map data group 37, the traveling control planning section 16 generates a trajectory for the target waiting position/posture identified at Step S903 and proceeds to Step S905. At Step S907, the traveling control planning section 16 generates a trajectory for normal traveling and proceeds to Step S905.

When the trajectory is generated at Step S904 or Step S907, at Step S905, the traveling control planning section 16 generates traveling control information on the basis of the trajectory. At subsequent Step S906, the traveling control planning section 16 stores, as the traveling control data group 39, the traveling control information generated at Step S905 on the storage section 30 and ends the process depicted in FIG. 11.

Figure 12:
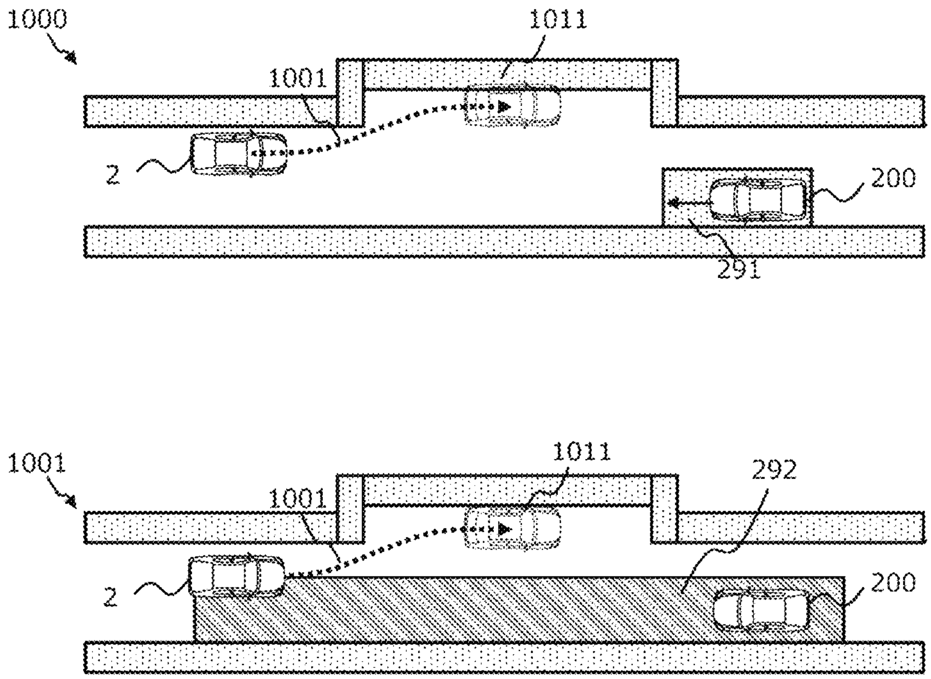
FIG. 12 is a figure depicting a state where a trajectory of a subject vehicle is planned using a collision risk area and an immobility risk area in the scene in a top diagram of FIG. 2.

An example of Step S903 and Step S904 is explained using FIG. 12. FIG. 12 is a figure depicting a state where a trajectory 1001 of the subject vehicle 2 is planned using the collision risk area 291 and the immobility risk area 292 in the scene depicted in the top diagram of FIG. 2. At Step S903, by referring to the immobility risk area 292, an area without an immobility risk is searched for around the action goal 262 of the current coordinated-action step of the subject vehicle 2 in FIG. 2. In the case of this scene, the position of the action goal 262 is without an immobility risk. Hence, the position of the action goal 262 is set as a target waiting position/posture 1011. Then, at Step S904, by referring to the collision risk area 291, a trajectory along which the passing area of the subject vehicle 2 does not overlap a collision risk is planned for the target waiting position/posture 1011.

As mentioned above, by using the immobility risk map, the waiting position/posture at the time of completion of the current coordinated-action step does not overlap the action area of the next coordinated-action step of the second vehicle 200. Accordingly, the coordinated action by the second vehicle 200 is not obstructed. Note that, whereas Step S903 and Step S904 are explained separately in the present implementation example, Step S903 and Step S904 may be implemented simultaneously. That is, conditions under which a target waiting position/posture not overlapping the immobility risk map and a trajectory not overlapping the collision risk map are satisfied may be searched for simultaneously.

Figure 13:
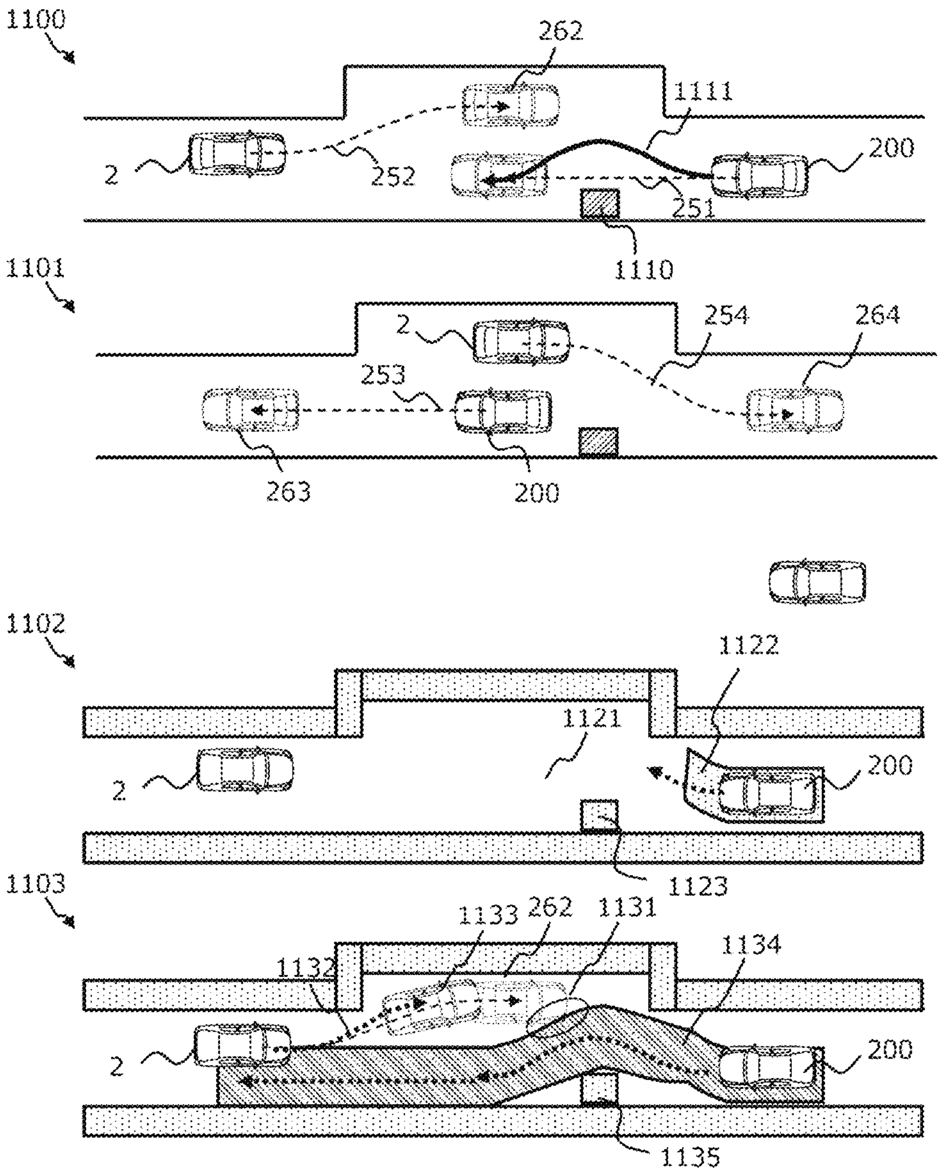
FIG. 13 is a figure for explaining an operation performed by the vehicle system in a scene different from FIG. 2.

FIG. 13 is a figure for explaining an operation performed by the vehicle system 1 in a scene different from that of FIG. 2. In FIG. 13, in addition to the configuration of the scene in FIG. 2, there is a stationary object 1110, which is an obstacle to traffic. Therefore, in the scene in the top diagram of FIG. 13, at Step S604, the mobile object action predicting section 13 predicts such a traveling path 1111 as to avoid the stationary object 1110 for the action 251 by the second vehicle 200. Accordingly, at Step S803 to Step S808, the immobility risk map generating section 15 estimates a meandering predicted action area 1134 as an immobility risk and generates an immobility risk map 1103 on the basis of the traveling path 1111 and the like.

When the traveling control planning section 16 calculates a target waiting position/posture of the action 252 by the subject vehicle 2 by using the immobility risk map 1103 at Step S903, the target waiting position/posture overlaps the immobility risk at a portion denoted by a reference symbol 1131 in FIG. 13. To avoid this, the traveling control planning section 16 searches for a waiting position/posture that does not overlap the immobility risk, near the action goal 262, and specifies a target waiting position/posture 1133. This waiting position/posture does not overlap the action area of the second vehicle 200, and thus does not obstruct the coordinated action by the second vehicle 200. As mentioned above, in an action coordinated with another mobile object, by predicting an action area of a coordinated-action step of the other mobile object and setting a waiting position/posture of a coordinated-action step of the subject vehicle 2 such that the action area as an immobility restriction area is avoided, it becomes possible to implement a coordinated action smoothly without falling into a deadlocked state in various scenes.

According to the first embodiment mentioned above, the following effects and advantages are achieved. (1) The electronic control apparatus 3 is mounted on the vehicle 2. The electronic control apparatus 3 includes the information acquiring section 11 that acquires traveling environment information concerning the traveling environment around a vehicle 2, i.e., the sensor detection data group 31, the vehicle information data group 32, and the road environment data group 33, the immobility risk map generating section 15 that estimates an immobility restriction area on the basis of the traveling environment information, the immobility restriction area being an area where, if the vehicle 2 is immobilized therein, the vehicle 2 obstructs an action by a mobile object other than the vehicle 2 and being an area where immobility of the vehicle 2 is restricted, and the traveling control planning section 16 that plans traveling control of the vehicle 2 on the basis of the estimated immobility restriction area. Accordingly, smooth passing-by can be realized as illustrated in FIG. 12 and FIG. 13.

(2) In a case where the vehicle 2 needs to be immobilized in a predetermined area, at Step S903 in FIG. 11, the traveling control planning section 16 plans traveling control such that the vehicle 2 is immobilized in an area which is in the predetermined area but does not overlap the immobility restriction area. Accordingly, smooth passing-by can be realized since the vehicle 2 waits at a position not overlapping the trajectory of the second vehicle 200.

(3) The mobile object other than the vehicle 2 is a mobile object included in the traveling environment information and located around the vehicle. The electronic control apparatus 3 includes the coordinated action planning section 12 that decides a coordinated action procedure coordinated with the mobile object. The immobility restriction area is an area where, if the vehicle 2 is immobilized therein, the vehicle 2 obstructs an action by the mobile object in the coordinated action procedure. Accordingly, since the subject vehicle 2 avoids immobility in immobility restriction area where the action by the second vehicle 200 is obstructed, smooth passing-by with the second vehicle 200 can be realized.

(4) As depicted in FIG. 10, the immobility risk map generating section 15 estimates a mobile object estimated action area where the mobile object can pass through in an action by the mobile object in the coordinated action procedure, and estimates the immobility restriction area on the basis of the mobile object estimated action area. Accordingly, obstruction of passage of another mobile object can be prevented.

(5) As depicted as Steps S903 and S904 in FIG. 11, the traveling control planning section 16 plans such a target waiting position/posture of the vehicle 2 in the coordinated action procedure that the target waiting position/posture does not overlap the immobility restriction area.

(6) The electronic control apparatus 3 includes the collision risk map generating section 14 that estimates a collision risk area with a risk of a collision of the vehicle with an obstacle on the basis of the traveling environment information. The traveling control planning section 16 plans such traveling control that the vehicle 2 does not enter the collision risk area and the vehicle 2 is not immobilized in the immobility risk area.

Second Embodiment

A second embodiment of the electronic control apparatus is explained with reference to FIG. 14 and FIG. 15. In the following explanation, constituent elements which are the same as constituent elements in the first embodiment are given the same reference symbols, and differences are mainly explained. Matters that are not explained particularly are the same as their counterparts in the first embodiment. The present embodiment is mainly different from the first embodiment in that differences of the severities of immobility risks on an immobility risk map are used to determine an appropriate waiting position/posture.

Figure 14:
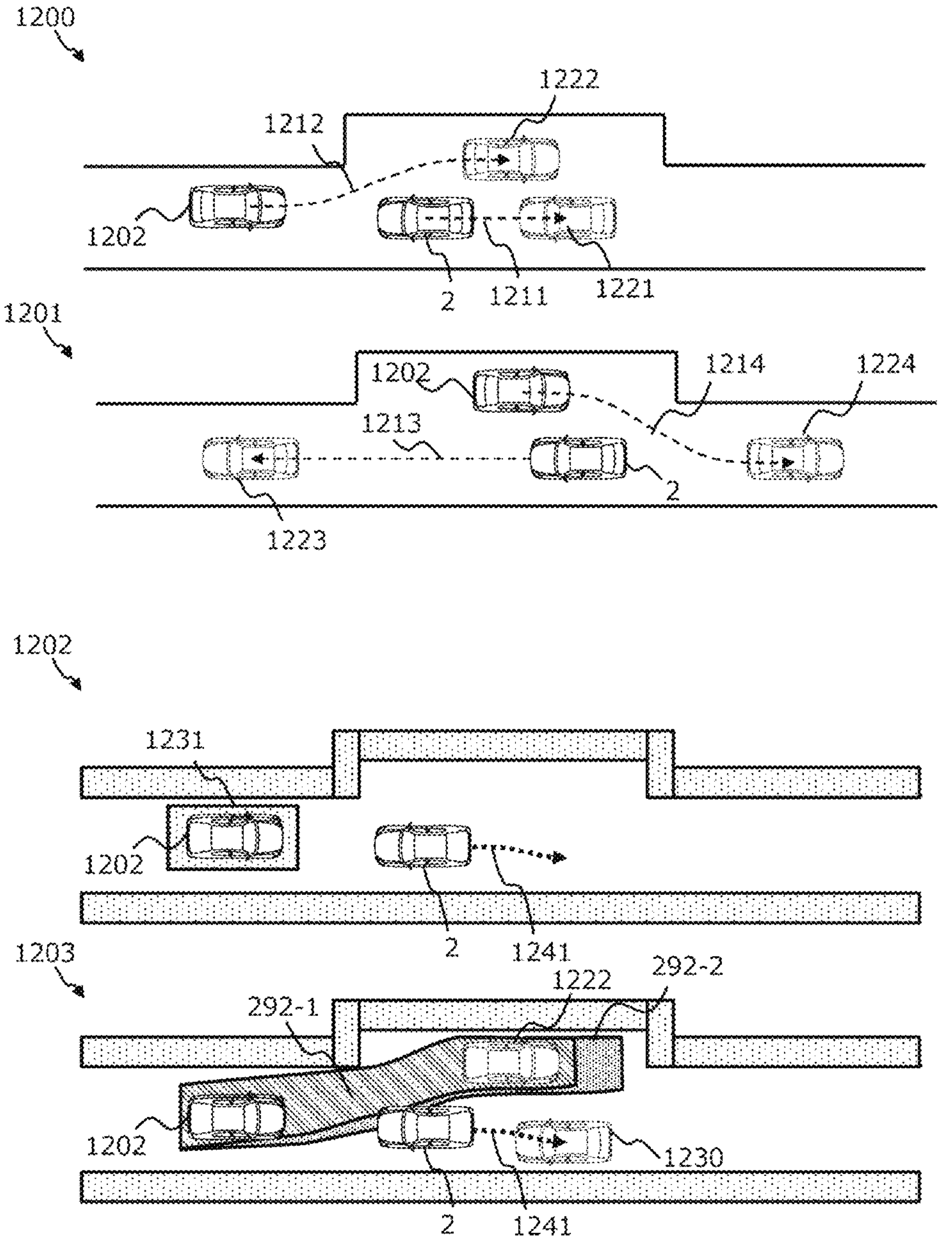
FIG. 14 is a figure depicting a traveling scene for operation explanation of a second embodiment and part of an operation performed by the vehicle system in the traveling scene.

FIG. 14 is a figure depicting a traveling scene for operation explanation of the second embodiment and part of an operation performed by the vehicle system 1 in the traveling scene. A traveling scene 1200 and a traveling scene 1201 depict the procedure of an action coordinated with a second vehicle 1202. In the scene in FIG. 14, the subject vehicle 2 is traveling from the right side to the left side, and the coordinated action planning section 12 predicts that the second vehicle 1202 traveling on a side where there is an evacuation area will evacuate to the evacuation area. In the traveling scene 1200, the subject vehicle 2 is too close to the second vehicle 1202 and is thus obstructing an action 1212 by the second vehicle 1202 to move to the evacuation area. To cope with this situation, the subject vehicle 2 implements an action 1211 to back up. The traveling scene 1201 depicting a coordinated action procedure thereafter is similar to the traveling scene depicted in the bottom diagram in FIG. 2.

The reference symbols 1202 and 1203 in FIG. 14 denote a collision risk map and an immobility risk map in the action 1211 in the traveling scene 1200. When mapping immobility risks of the second vehicle 1202 onto an immobility risk map at Step S803 to Step S808, the immobility risk map generating section 15 in the present embodiment not only arranges a main immobility risk area 292-1, which is a predicted action area related to the action 1212 by the second vehicle 1202, but also arranges a low immobility risk area 292-2 with a relatively low risk severity around the main immobility risk area 292-1.

The main immobility risk area 292-1 means an area where the action 1212 by the second vehicle 1202 is surely obstructed. The low immobility risk area 292-2 means an area where there is a possibility that implementation of the action 1212 by the second vehicle 1202 is hindered. The low immobility risk area 292-2 is located at the outer circumference of the main immobility risk area 292-1, and in particular, the low immobility risk area 292-2 is set wider in a direction parallel to the advancing direction of the subject vehicle.

When the subject vehicle 2 is close to an action area of the second vehicle 1202, the driver of the second vehicle 1202 is required to operate the vehicle with precision higher than necessary and feels pressured. To avoid this situation, in reality, the subject vehicle 2 should back up so as to ensure a sufficient space for the action 1212. An immobility risk 292-2 is set taking into consideration safety in this manner. At Step S903, the traveling control planning section 16 decides such a target waiting position/posture 1230 as to avoid also the immobility risk 292-2 with a relatively low risk severity as much as possible, and thereby ensures a sufficient space for the action 1212 by the second vehicle 1202. Accordingly, it is possible to prevent the driver of the second vehicle 1202 from feeling pressured.

Figure 15:
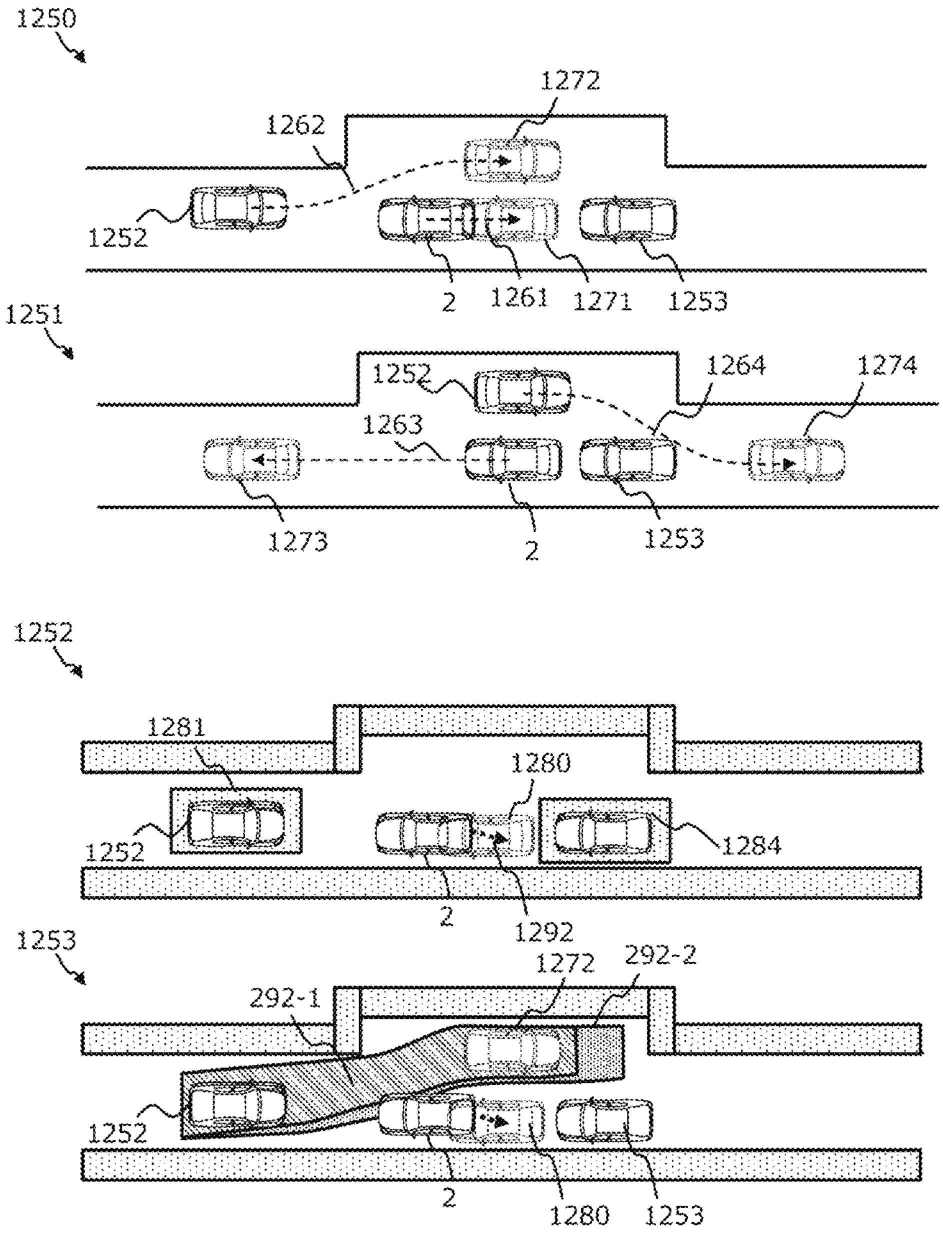
FIG. 15 is a figure depicting an example of a traveling scene for operation explanation of the second embodiment.

FIG. 15 is a figure depicting an example of a traveling scene for operation explanation of the second embodiment. The traveling scene is similar to that of FIG. 14 but is different in that there is a third vehicle 1253 behind the subject vehicle 2. In this traveling scene, a collision risk area 1284 with a risk of a collision with the third vehicle 1253 is set behind the subject vehicle 2. It is thus not possible for the subject vehicle 2 to back up as denoted by a reference symbol 1280. Accordingly, there are no spaces to completely avoid the low immobility risk area 292-2 with a relatively low risk severity. In such a case, the electronic control apparatus 3 permits the target waiting position/posture of the subject vehicle 2 to overlap the low immobility risk area 292-2 with a relatively low risk severity.

An immobility risk 292-2 is set for paying attention to ease of driving of a second vehicle 1252, and does not necessarily obstruct an action 1262 by the second vehicle 1252. This reflects the fact that, in a situation without a sufficient space therebetween, it is unavoidable for vehicles to pass by each other in an environment where they are in close proximity. Note that, if the risk severities of immobility risk 292-1 and 292-2 are uniformly set, handling depending on situations as in the scenes in FIG. 14 and FIG. 15 becomes difficult.

As mentioned above, by setting immobility risks covering not only a predicted action area of a mobile object as a coordinated-action subject but an area larger than the predicted action area taking into consideration also the influence on ease of an action by the mobile object, it is possible to realize a smooth coordinated action paying attention to ease of the action by the mobile object. In addition, by setting immobility risks such that a distinction can be made between risk severities of an area where an action by a mobile object as a coordinated-action subject is obstructed completely and an area where ease of the action by the mobile object is influenced, it becomes possible to determine a target waiting position/posture which is appropriate for a situation, and it is possible to realize a smooth coordinated action.

According to the second embodiment mentioned above, the following effects and advantages are achieved.

(7) The immobility risk area includes information concerning a degree of hindrance to implementation of an action by the mobile object. That is, there are the main immobility risk area 292-1 with a relatively high risk severity and the low immobility risk area 292-2 with a relatively low risk severity. In a case where there are no target waiting positions/postures that do not overlap the main immobility risk area 292-1 and the low immobility risk area 292-2, the traveling control planning section 16 permits planning of a target waiting position/posture that overlaps the low immobility risk area 292-2.

Third Embodiment

A third embodiment of the electronic control apparatus is explained with reference to FIG. 16. In the following explanation, constituent elements which are the same as constituent elements in the first embodiment are given the same reference symbols, and differences are mainly explained. Matters that are not explained particularly are the same as their counterparts in the first embodiment. The present embodiment is mainly different from the first embodiment in that the mobile object action predicting section 13 takes into consideration the possibility of presence of a mobile object at a blind spot.

The mobile object action predicting section 13 in the present embodiment performs the following process in addition to the processes in the first embodiment. That is, by referring to the sensor detection data group 31 and the road environment data group 33, the mobile object action predicting section 13 predicts that there is a mobile object at a blind spot and the mobile object will move in such a manner as to obstruct the movement of the subject vehicle 2. A specific example is explained with reference to FIG. 16.

Figure 16:
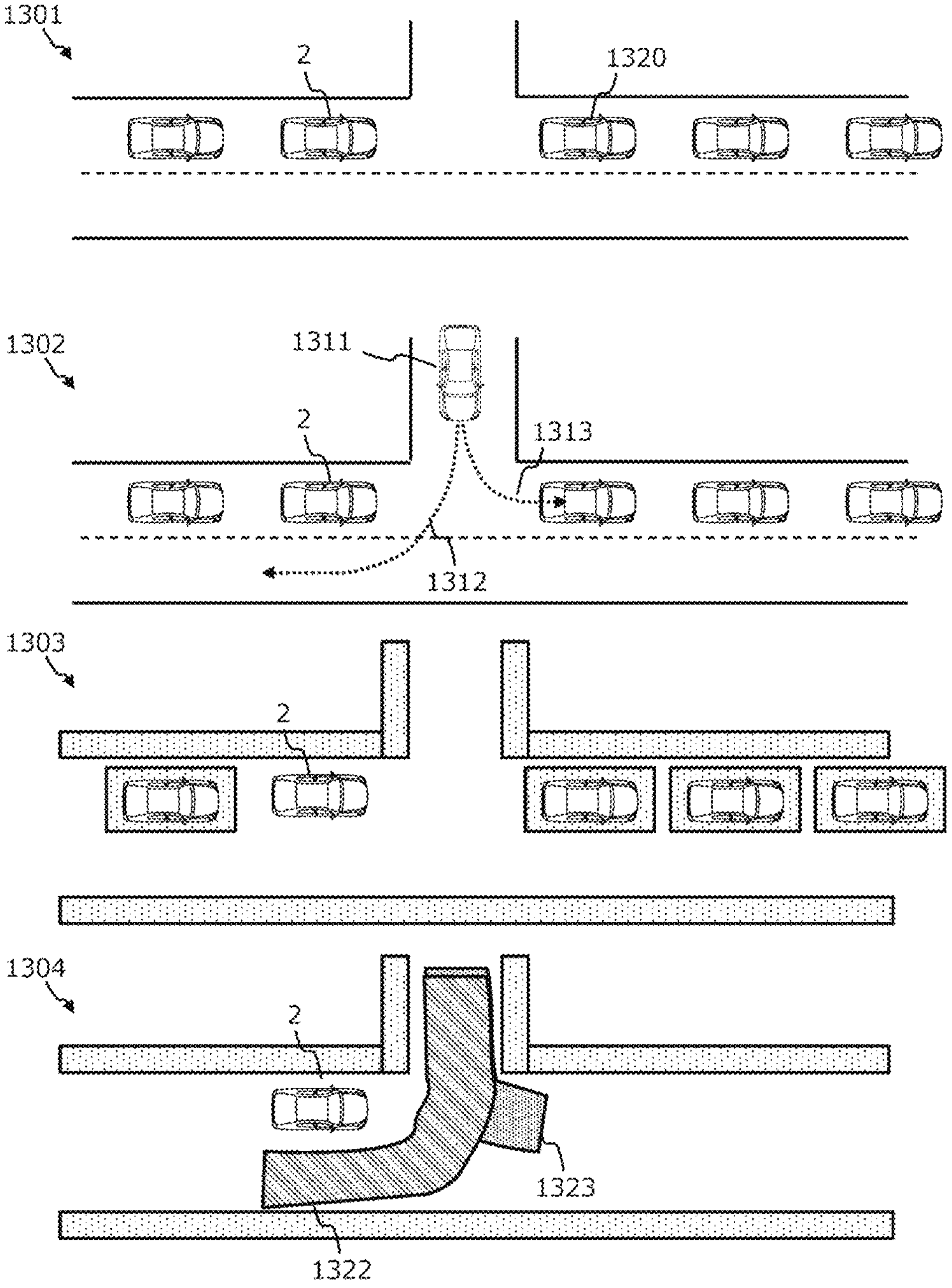
FIG. 16 is a figure depicting a process example of the mobile object action predicting section in a third embodiment.

FIG. 16 is a figure depicting a process example of the mobile object action predicting section 13 in the third embodiment. FIG. 16 includes a traveling scene 1301, a traveling scene 1302, a collision risk map 1303, and an immobility risk map 1304. In the traveling scene 1301, the subject vehicle 2 is stopped on a road at the time of a traffic jam. There is a side road just ahead on the left side of the subject vehicle 2. The side road includes a blind spot of sensors of the subject vehicle 2, and there is a possibility that another vehicle enters the road where the subject vehicle 2 is traveling. In a situation like this, in anticipation of appearance of another vehicle on the side road at a future time point, it is desirable that the subject vehicle 2 be not immobilized in an area near the side road such that an action by the other vehicle will not be obstructed.

An immobility risk map can be applied also to a case like this. Whereas, regarding the mobile object MO detected by the external sensor group 4, the mobile object action predicting section 13 predicts the traveling path and the traveling trajectory of the mobile object MO according to the process procedure of FIG. 8 in the first and second embodiments of the present invention, a virtual mobile object VMO is further taken into consideration as the mobile object MO in the present embodiment. The virtual mobile object VMO embodies a mobile object that is at a blind spot of the external sensor group 4 and may not be detected, or a mobile object that is not present currently but may appear at a future time point.

In the traveling scene in FIG. 16, assuming that another vehicle appears in the side road at a future time point, a virtual second vehicle 1311 is arranged as depicted in the traveling scene 1302. The mobile object action predicting section 13 predicts a possible traveling path that the virtual second vehicle 1311 follows. Since the temporal concept cannot be applied to the virtual mobile object, a traveling trajectory is not predicted. In addition, since the state of the virtual mobile object cannot be determined, there are a plurality of action candidates in some cases (an action 1312 and an action 1313). The mobile object action predicting section 13 predicts traveling paths for all the candidates. Then, the immobility risk map generating section 15 arranges immobility risks as represented by the immobility risk map 1304 on the basis of the predicted paths of the virtual mobile object generated by the mobile object action predicting section 13.

The virtual second vehicle 1311 is not a coordinated-action subject in the process procedure in FIG. 11. Hence, it is determined at Step S902 that there is not a mobile object as a coordinated-action subject, and the traveling control planning section 16 generates a trajectory for normal traveling at Step S907. At this time, the traveling control planning section 16 determines a waiting location at the time of a traffic jam by using an immobility risk map. That is, the traveling control planning section 16 generates such a trajectory that the subject vehicle 2 is not stopped in areas corresponding to the immobility risk map 1304. In a case where a preceding vehicle 1320 of the subject vehicle 2 is stopped just ahead of the side road as in the traveling scene in FIG. 16, there is a risk of a collision with the preceding vehicle 1320 as represented by the collision risk map 1303. Hence, it is determined that the subject vehicle 2 cannot pass through an immobility risk 1323, and the subject vehicle 2 waits at the current position without moving forward.

Note that, when the preceding vehicle 1320 moves forward and a sufficient space is generated between the risk of the collision with the preceding vehicle 1320 and the immobility risk 1323, it is determined that the subject vehicle 2 can pass through the immobility risk 1323 without being immobilized therein, and a trajectory for moving forward is generated. Note that, since immobility means staying at a predetermined location or in a predetermined area for a certain period of time or longer, even if the subject vehicle 2 is in a state where it cannot pass through an immobility risk at a certain time point, the subject vehicle 2 is allowed to enter the immobility risk in a case like the following one. That is, in a case where it is predicted that it will become possible for the subject vehicle 2 to pass through an immobility risk area in the near future, and where it can be determined that the period of time during which the subject vehicle 2 will stay in the immobility risk area will be equal to or shorter than a predetermined value, as in a case where a vehicle in front of the preceding vehicle has started moving forward or in other cases, the subject vehicle 2 is allowed to enter the immobility risk.

According to the third embodiment mentioned above, the following effects and advantages are achieved.

(8) A mobile object other than the vehicle 2 is a mobile object that can appear around the vehicle 2 at a future time point and that is estimated from the traveling environment information, and is, for example, the virtual second vehicle 1311 in FIG. 16. Accordingly, in the present embodiment, by generating an immobility risk map supposing that there is another vehicle at a blind spot of the subject vehicle 2, obstruction of the advancing movement of the vehicle located at the blind spot is prevented.

(9) The traveling control planning section 16 plans traveling control such that a period of time of immobility in the immobility restriction area is equal to or shorter than a predetermined value.

Fourth Embodiment

A fourth embodiment of the electronic control apparatus is explained with reference to FIG. 17. In the following explanation, constituent elements which are the same as constituent elements in the first embodiment are given the same reference symbols, and differences are mainly explained. Matters that are not explained particularly are the same as their counterparts in the first embodiment. The present embodiment is mainly different from the first embodiment in that the immobility risk map generating section 15 maps, onto an immobility risk map, also areas where the subject vehicle 2 cannot be stopped. The immobility risk map generating section 15 in the present embodiment performs the following process in addition to the processes in the first embodiment. That is, the immobility risk map generating section 15 makes an immobility risk map reflect traffic regulations related to stops obtained from the road environment data group 33.

Figure 17:
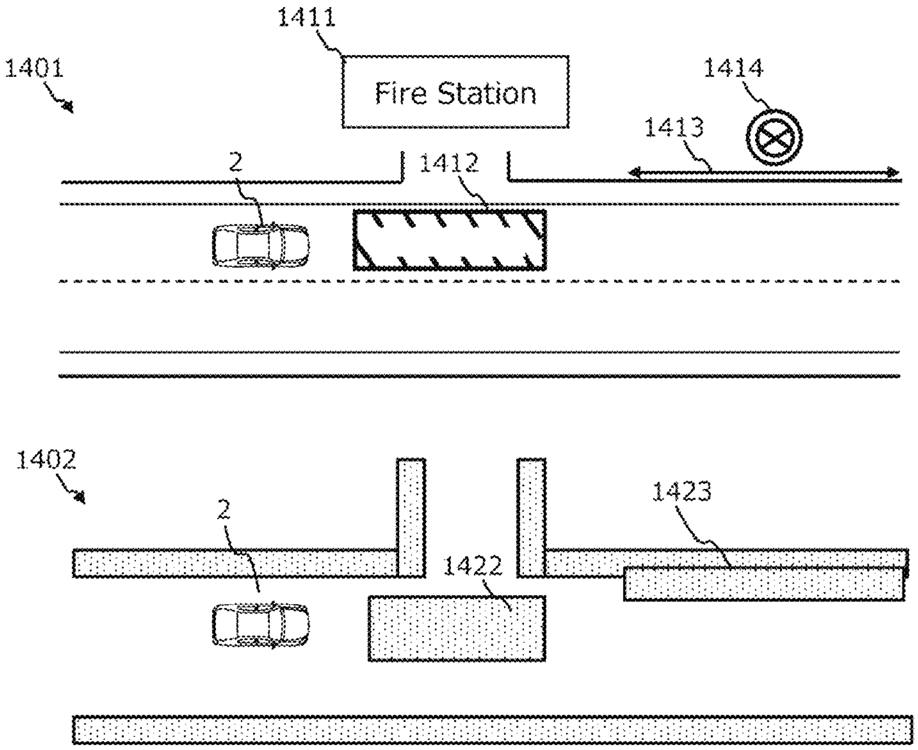
FIG. 17 is a figure depicting a process example of the immobility risk map generating section in a fourth embodiment.

FIG. 17 is a figure depicting a process example of the immobility risk map generating section 15 in the fourth embodiment. FIG. 17 depicts a traveling scene 1401 and a corresponding immobility risk map 1402. In the traveling scene 1401, a road marking of a stop prohibited area 1412 and a traffic sign 1414 representing a parking prohibited zone 1413 are depicted on a road where the subject vehicle 2 is traveling. The immobility risk map generating section 15 generates an immobility risk map according to the process procedure in FIG. 10. At this time, at Step S809, the immobility risk map generating section 15 maps not only an untravellable area but also a stop prohibited area onto the immobility risk map. Information concerning road markings and traffic signs is obtained by referring to the road environment data group 33 acquired from the map information managing apparatus 6.

The immobility risk map generating section 15 identifies a stop prohibited area from the information concerning road markings and traffic signs and arranges an immobility risk at a relevant location. In FIG. 17, the stop prohibited area 1412 corresponds to an immobility risk 1422, and the parking prohibited zone 1413 corresponds to an immobility risk 1423. Then, as with the third embodiment, the traveling control planning section 16 generates such a trajectory that the subject vehicle 2 will not be stopped on any immobility risk.

The traveling control planning section 16 can also determine information concerning traffic regulations such as road markings and traffic signs like this individually by directly referring to the road environment data group 33. However, a large number of various traffic regulations need to be taken into consideration in automatic traveling on a road, and moreover, each location where the subject vehicle 2 can be stopped or immobilized needs to be identified taking into consideration actions coordinated with mobile objects like those mentioned in the first to third embodiments. Construction of processes for making individual determination is thus complicated. In the present embodiment, by making it possible to perform management and make determinations as to those elements that regulate immobility of the subject vehicle 2 on an immobility risk map in a centralized and integrated manner, it is made easier for the traveling control planning section 16 to identify an appropriate position/posture at or in which the subject vehicle 2 can be immobilized.

According to the fourth embodiment mentioned above, the following effects and advantages are achieved.

(10) The immobility risk map generating section 15 estimates the immobility risk area further on the basis of traffic regulation information concerning an area around the vehicle included in the traveling environment information. Therefore, the electronic control apparatus 3 can realize smooth passing-by with another vehicle while keeping to traffic regulations.

(11) The traffic regulation information is a parking prohibited area or a stop prohibited area as depicted in FIG. 17. Therefore, the electronic control apparatus 3 can realize smooth passing-by with another vehicle while keeping to traffic regulations such as parking prohibited areas and stop prohibited areas.

Fifth Embodiment

Hereinafter, a fifth embodiment of the electronic control apparatus is explained with reference to FIG. 18 to FIG. 31. The present embodiment is different from the embodiments above in that a situation after passing-by is also taken into consideration. Constituent elements identical to constituent elements in the first embodiment are given identical reference symbols, and explanations thereof are omitted.

Figure 18:
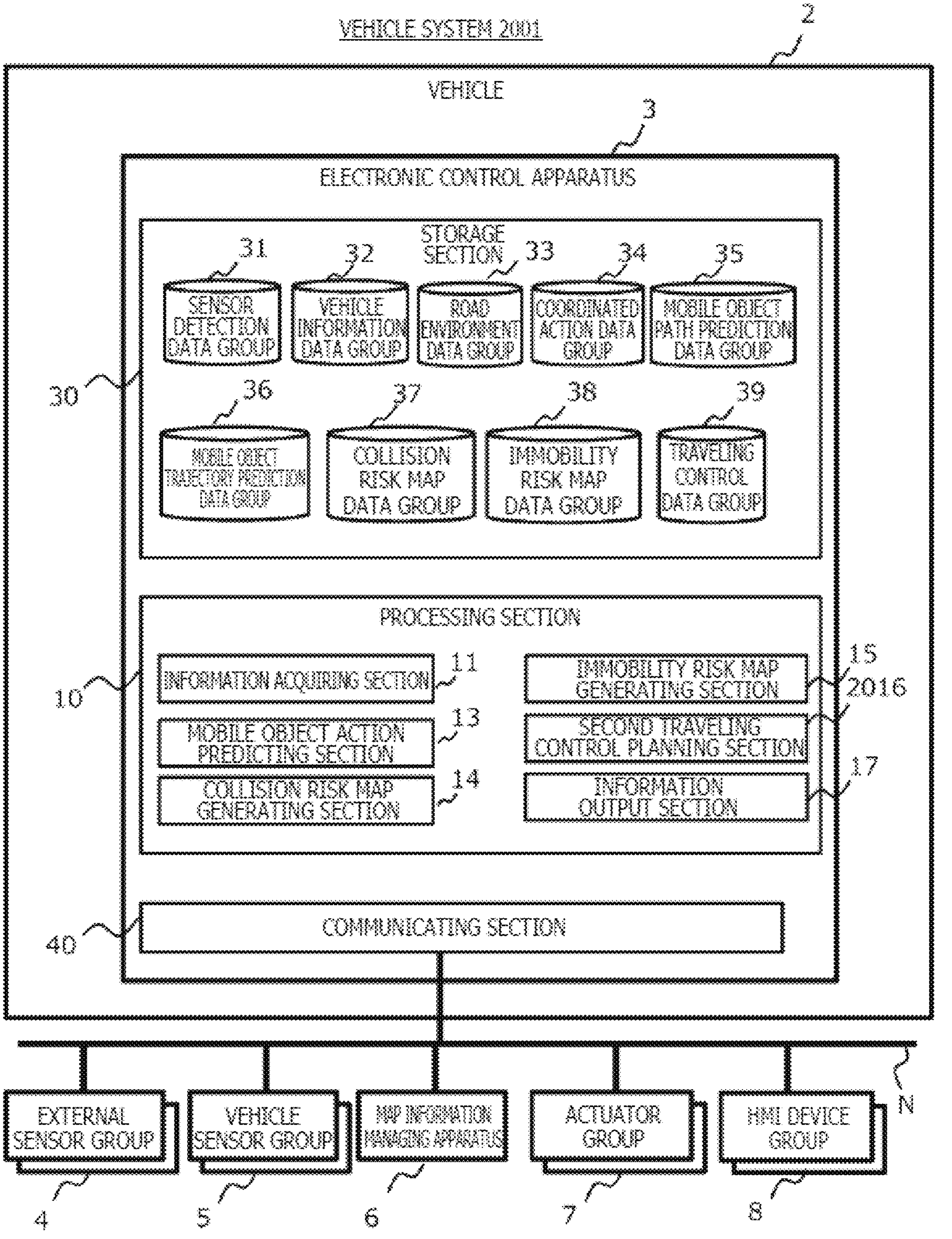
FIG. 18 is a functional block diagram depicting a configuration of a vehicle system in a fifth embodiment.

FIG. 18 is a functional block diagram depicting a configuration of a vehicle system 2001 including an electronic control apparatus 3 according to the fifth embodiment. The vehicle system 2001 is mounted on a vehicle 2. The vehicle system 2001 performs appropriate driving assistance or traveling control by recognizing the situation related to traveling roads around the second vehicle 2002 and obstacles such as vehicles around the second vehicle 2002. The driving assistance includes also presentation of information to a driver driving the vehicle 2.

Figure 19:
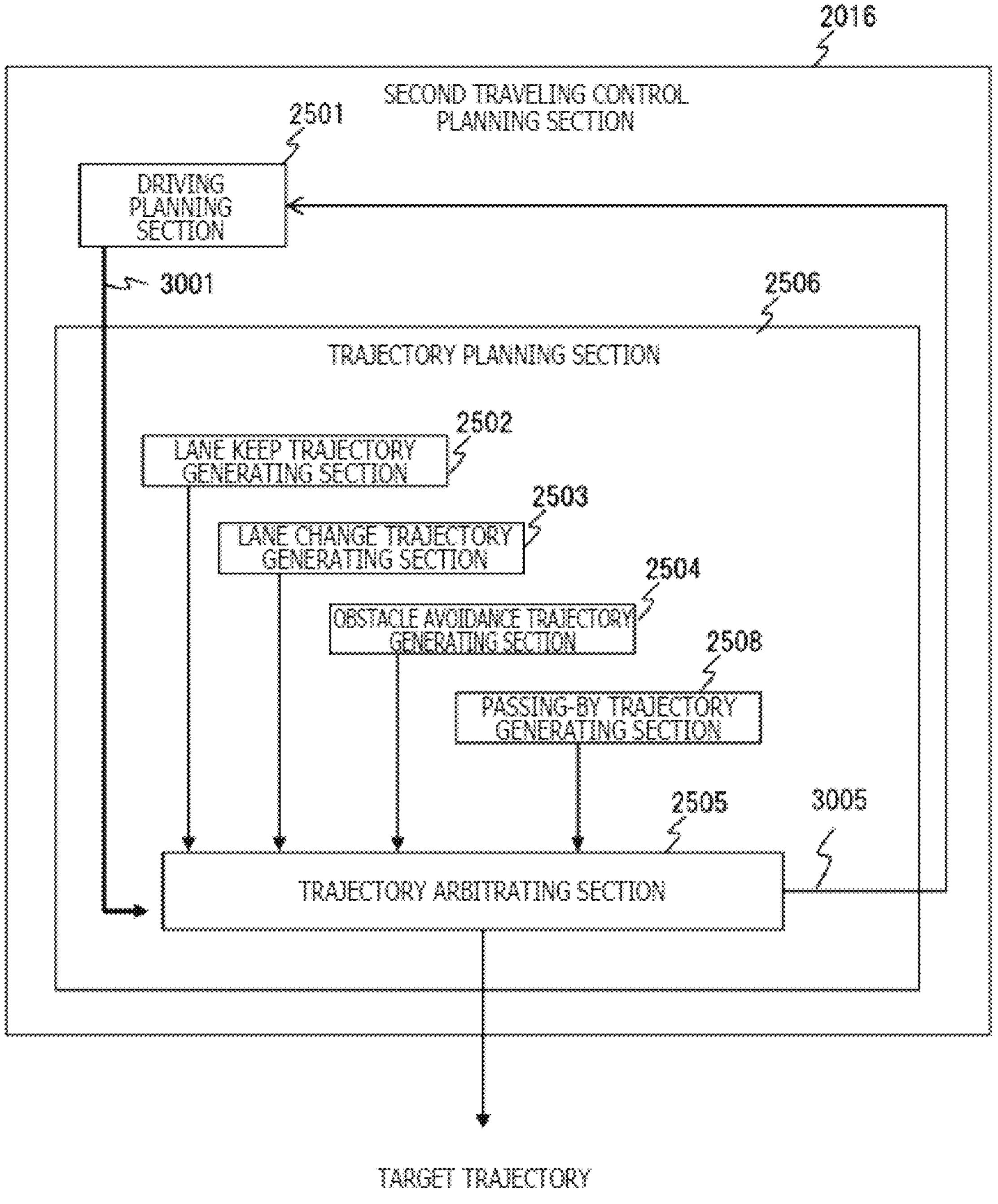
FIG. 19 is a functional configuration diagram of a second traveling control planning section in the fifth embodiment.

FIG. 19 is a functional configuration diagram of a second traveling control planning section 2016. The second traveling control planning section 2016 computes a target trajectory on the basis of a risk map, environment information, lane information, and map information. The second traveling control planning section 2016 includes a driving planning section 2501 and a trajectory planning section 2506. On the basis of route information, environment information, previous selection information 3005, and the like, the driving planning section 2501 calculates traveling mode candidate weights 3001.

Each of the traveling mode candidate weights 3001 is a weight, i.e., probability, of execution of one of a plurality of pre-specified traveling modes by the subject vehicle 2. There are four traveling modes in the present embodiment, namely, lane keep, lane change, obstacle avoidance, and passing-by, and the weights of the four traveling modes are represented by values V1 to V4, the total value of which is "100." That is, the traveling mode candidate weights 3001 are the values V1 to V4. For example, in a case where the subject vehicle 2 is traveling on a straight road, there are no vehicles or objects that should be avoided ahead, and route information also suggests that it is not necessary to change the lane to an adjacent lane, V1 corresponding to lane keep is "100," and V2 to V4 are set to "zero."

The trajectory planning section 2506 includes a lane keep trajectory generating section 2502, a lane change trajectory generating section 2503, an obstacle avoidance trajectory generating section 2504, a passing-by trajectory generating section 2508, and a trajectory arbitrating section 2505. The lane keep trajectory generating section 2502 generates a trajectory for keeping the subject vehicle 2 at the middle of the lane where the subject vehicle 2 is currently traveling. The lane change trajectory generating section 2503 generates a trajectory for changing the lane to an adjacent lane from the lane where the subject vehicle 2 is currently traveling. The obstacle avoidance trajectory generating section 2504 generates a trajectory for avoiding an obstacle body present on the lane where the subject vehicle 2 is currently traveling. The passing-by trajectory generating section 2508 generates a trajectory for passing by another vehicle as mentioned later.

The trajectory arbitrating section 2505 evaluates each of the trajectories generated by the lane keep trajectory generating section 2502, the lane change trajectory generating section 2503, the obstacle avoidance trajectory generating section 2504, and the passing-by trajectory generating section 2508, on the basis of degrees of safety in relation to surrounding objects and the traveling mode candidate weights 3001. For example, this evaluation can be performed by calculation of the product of the reciprocal of the minimum distance between a trajectory and an object and the value of a corresponding traveling mode candidate weight 3001. The trajectory arbitrating section 2505 identifies, as the best mode, the most highly evaluated traveling mode, and generates such traveling control information that the vehicle 2 travels along a trajectory of the best mode. Furthermore, the trajectory arbitrating section 2505 outputs the best mode as the previous selection information 3005 to the driving planning section 2501.

Figure 20:
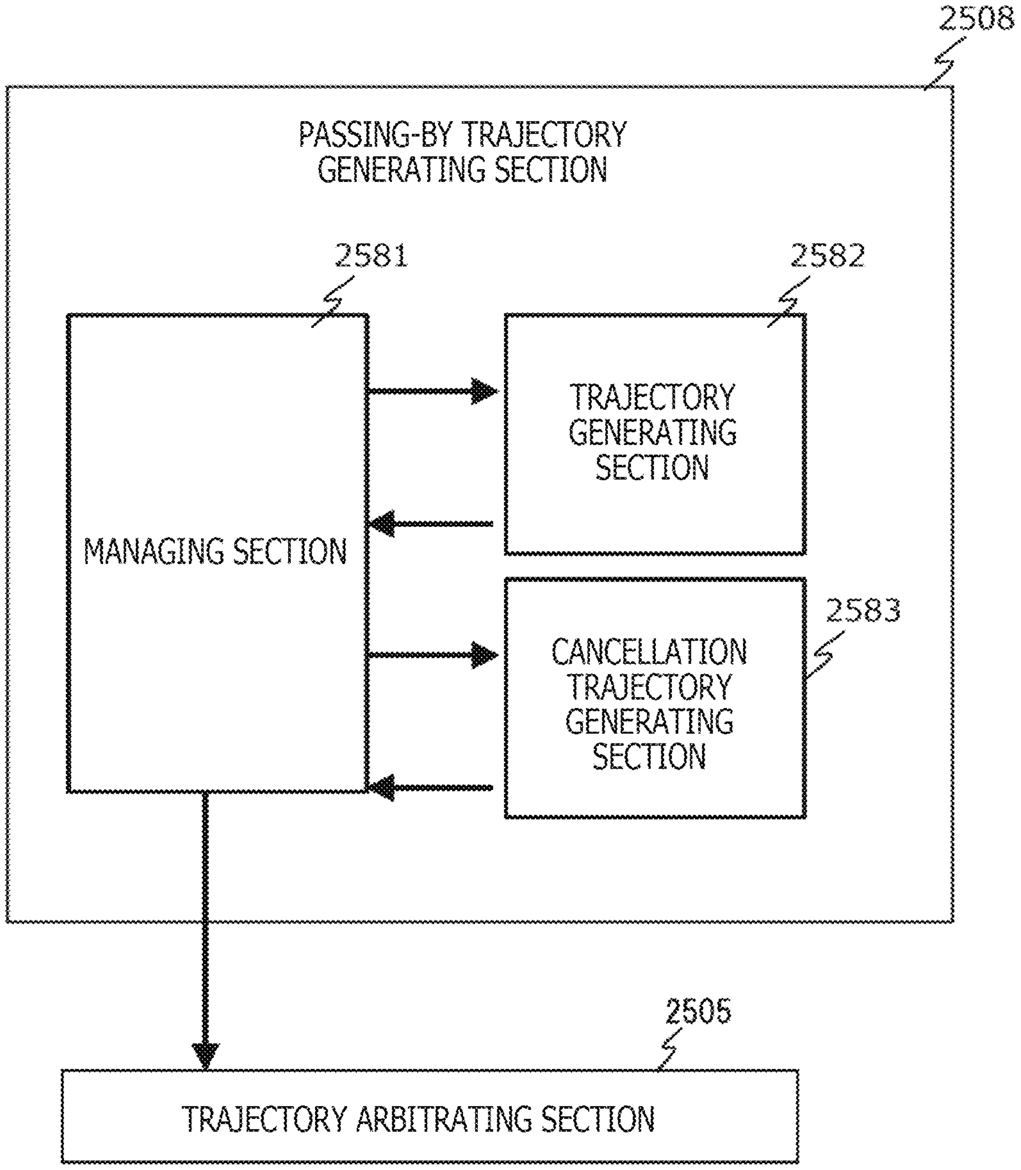
FIG. 20 is a detailed configuration diagram of a passing-by trajectory generating section.

FIG. 20 is a detailed configuration diagram of the passing-by trajectory generating section 2508. The passing-by trajectory generating section 2508 includes a managing section 2581, a trajectory generating section 2582, and a cancellation trajectory generating section 2583. The managing section 2581 manages a passing-by state mentioned later. The trajectory generating section 2582 generates a passing-by trajectory. The cancellation trajectory generating section 2583 generates a cancellation trajectory. The passing-by trajectory and the cancellation trajectory are mentioned specifically later.

Figure 21:
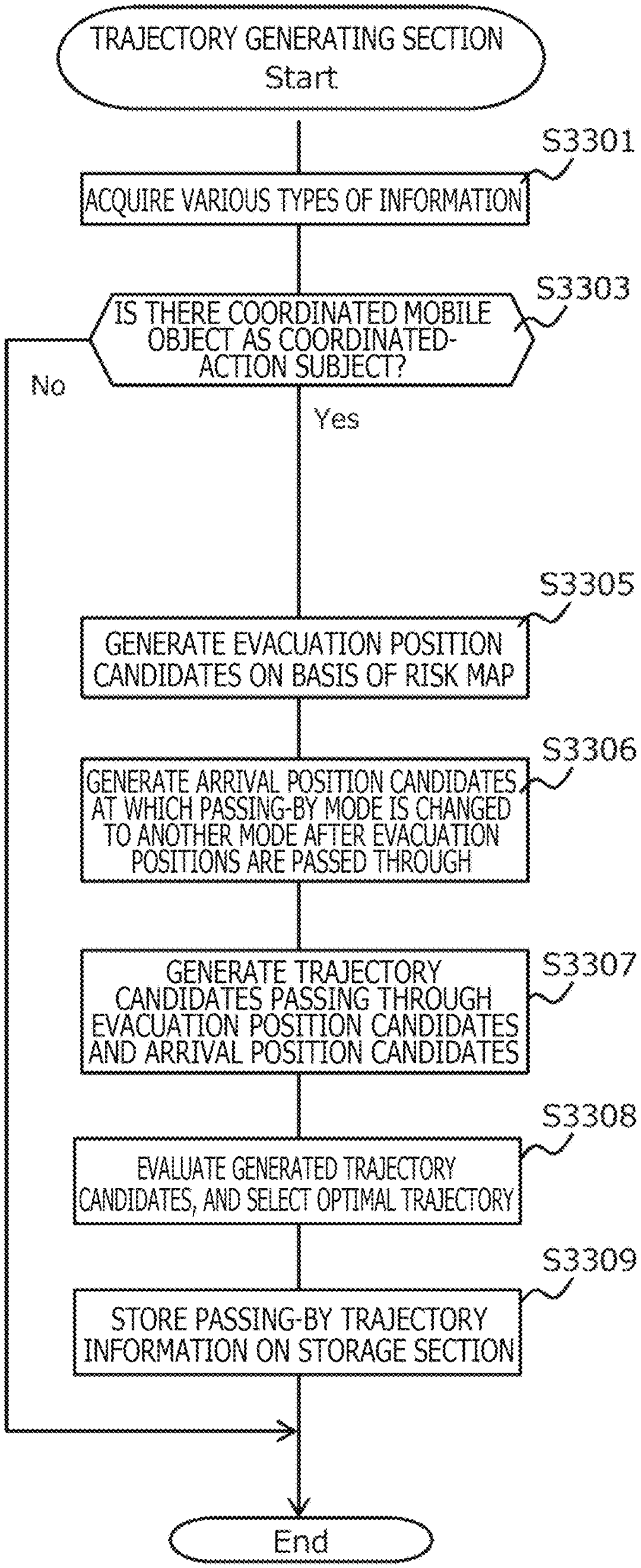
FIG. 21 is a flowchart depicting a process performed by a trajectory generating section.

FIG. 21 is a flowchart depicting a process performed by the trajectory generating section 2582 of the passing-by trajectory generating section 2508. First, at Step S3301, the trajectory generating section 2582 acquires the sensor detection data group 31, the road environment data group 33, the coordinated action data group 34, the mobile object trajectory prediction data group 36, the collision risk map data group 37, and the immobility risk map data group 38. At subsequent Step S3302, by referring to the coordinated action data group 34, the trajectory generating section 2582 determines whether or not there is a coordinated mobile object, which is a mobile object as a coordinated-action subject. In a case where it is determined that there are no coordinated mobile objects, the trajectory generating section 2582 ends the process depicted in FIG. 21. In a case where it is determined that there is a coordinated mobile object, the trajectory generating section 2582 proceeds to Step S3305.

At Step S3305, on the basis of a collision risk map and an immobility risk map, the trajectory generating section 2582 generates a plurality of evacuation position/posture candidates. Details of the process at this step are explained later with reference to a figure. At subsequent Step S3306, the trajectory generating section 2582 generates arrival position candidates, which are candidates of arrival positions at which the passing-by mode is changed to another mode after an evacuation position is passed through. Details of the process at this step are explained later with reference to a figure.

At subsequent Step S3307, the trajectory generating section 2582 generates trajectory candidates that pass through the evacuation position/posture candidates and the arrival position candidates. Since there are a plurality of the evacuation position/posture candidates as mentioned before, there are also a plurality of trajectory candidates generated at this step. At subsequent Step S3308, the trajectory generating section 2582 evaluates each of the trajectory candidates generated at Step S3307, and selects the most highly evaluated trajectory. For example, evaluation values used for this evaluation can be calculated such that an evaluation value increases as the degree of overlapping between a trajectory and an immobility risk area decreases, and the evaluation value increases as the length of the trajectory decreases. At subsequent Step S3309, the trajectory generating section 2582 stores, on the storage section 30, information concerning the trajectory selected at Step S3308, as a trajectory generated by the trajectory generating section 2582.

Figure 22:
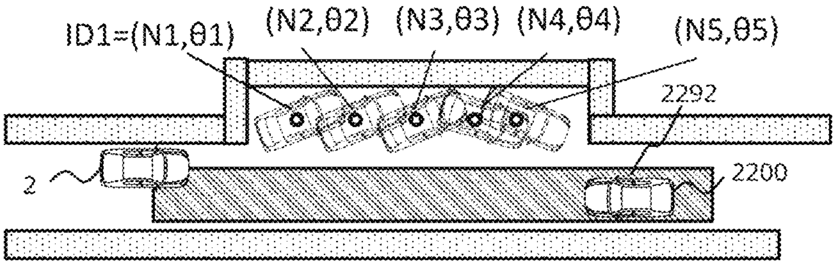
FIG. 22 is a figure for explaining a method of generating evacuation position/posture candidates at Step S3305 in FIG. 21.

FIG. 22 is a figure for explaining a method of generating evacuation position/posture candidates at Step S3305 in FIG. 21. Note that the generation method explained here is merely an example, and evacuation position/posture candidates may be generated by another technique. As depicted in FIG. 22, there is an oncoming vehicle 2200 ahead of the subject vehicle 2, and a coordinated action should be performed with the oncoming vehicle 2200. Then, there is an evacuation space ahead on the left side of the subject vehicle 2. Since an immobility risk area 2292 generated by the immobility risk map generating section 15 is located ahead of the subject vehicle and on the subject vehicle 2, in order to realize a coordinated action, here, passing-by traveling, the subject vehicle 2 needs to move, i.e., evacuate, to a location where there is not the immobility risk area.

In view of this, evacuation posture/position candidates (N1, θ1) to (N5, θ5) are generated in an area in which there is not the immobility risk area 2292, and which does not contact a collision risk area 2291. N represents a plane position, and θ represents a yaw angle of the vehicle 2. The number of evacuation posture/position candidates to be generated at this time can be any number. The trajectory generating section 2582 chooses a location close to an immobility risk area while avoiding areas where the subject vehicle 2 overlaps the immobility risk area, taking into consideration the size of the subject vehicle 2.

Figure 23:
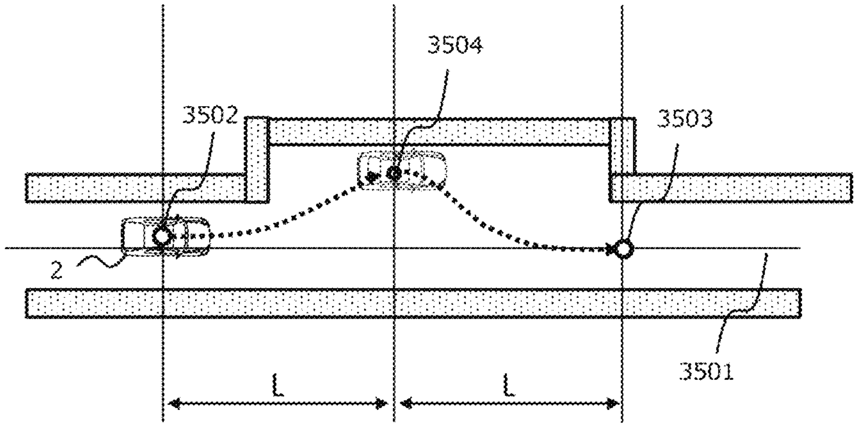
FIG. 23 is a figure for explaining a method of generating arrival position candidates at Step S3306 in FIG. 21.

FIG. 23 is a figure for explaining a method of generating arrival position candidates at Step S3306 in FIG. 21. Note that the generation method explained here is merely an example, and arrival position candidates may be generated by another technique. First, by referring to the road environment data group 33, the trajectory generating section 2582 identifies a centerline 3501 of the traveling lane where the subject vehicle 2 is traveling. Next, the trajectory generating section 2582 calculates, as a distance L, the interval between positions of a passing-by mode starting point 3502 and an evacuation position/posture candidate 3504 as projected onto the centerline 3501. Then, the trajectory generating section 2582 sets, as an arrival position candidate 3503, a point which is on the centerline 3501 and is the distance L ahead of the evacuation position/posture candidate 3504 as projected onto the centerline 3501 in a direction opposite to the passing-by mode starting point 3502.

Figure 24:
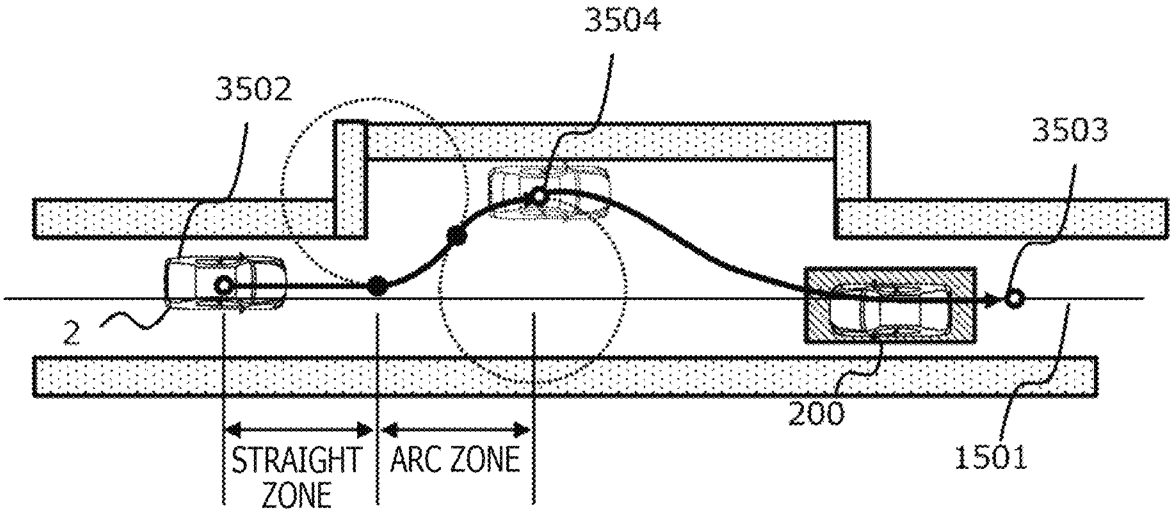
FIG. 24 is a figure for explaining a method of generating a trajectory candidate at Step S3307 in FIG. 21.

FIG. 24 is a figure for explaining a method of generating trajectory candidates at Step S3307 in FIG. 21. Note that the generation method explained here is merely an example, and trajectory candidates may be generated by another technique. As depicted in FIG. 24, the trajectory generating section 2582 generates a path candidate by combining a straight line and a plurality of circular curves. The trajectory generating section 2582 can generate a plurality of path candidates by changing the length of the straight portion, the radii of the circular curves, and the like. Note that the trajectory generating section 2582 may use clothoid curves instead of circular curves. The trajectory generating section 2582 may further set a speed for each trajectory.

The trajectory generating section 2582 computes a speed profile to be used at the time when the vehicle travels along a generated trajectory candidate. For example, the speed profile is one in which a speed is set for each of virtual time-series points that are set at predetermined positional intervals or predetermined temporal intervals along the trajectory candidate. The speeds set for the respective time-series points may be random values or may be constant values. The trajectory generating section 2582 creates a plurality of speed profiles, and evaluates each speed profile by using the following formula. Note that the total of calculation for all time-series points on a trajectory candidate by the following formula is an evaluation value EVV of the speed profile. The trajectory generating section 2582 uses, as a speed profile of a trajectory candidate, a speed profile having the smallest evaluation value EV1.

$$EVV = \sum \{w11\,(\text{the longitudinal acceleration of the subject vehicle})^\wedge 2 + w12\,(\text{the lateral acceleration of the subject vehicle})^\wedge 2 + w13\,(\text{the speed limit} - \text{the speed of the subject vehicle})^\wedge 2 + w14\,(\text{the value of a collision risk map})^\wedge 1\} \quad \text{Formula 1}$$

In Formula 1, each of w11 to w14 is a pre-specified coefficient. The value of the collision risk map in Formula 1 is the sum of the values of collision risk areas to be passed through in a case where time-series points are included in the collision risk areas, and is "zero" in a case where time-series points are not included in collision risk areas. The values of collision risk areas may be discrete values such as 0 and 1 representing whether or not there is a risk, or may be consecutive values such as 0 to 100 representing the severities of risks.

Details of Step S3308 in FIG. 21 are explained. The trajectory generating section 2582 evaluates each trajectory candidate in terms of the following five viewpoints, and adopts a trajectory candidate with the lowest trajectory evaluation value EVR, which is the total value of the evaluation value and a weighting factor. The five viewpoints are the safety, the convenience, the comfort of ride, the sense of discomfort, and the feeling of pressure on an oncoming vehicle. The trajectory evaluation value EVR is represented by the following Formula 2.

$$EVR = w1E1 + w2E2 + w3E3 + w4E4 + w5E5 \quad \text{Formula 2}$$

Note that each of w1 to w5 in Formula 2 is a pre-specified coefficient. Each of E1 to E5 is an evaluation value of one of the five viewpoints mentioned above.

For evaluation of the safety, the distance to an object around the subject vehicle 2 and an actual risk value are used. For example, one possible method uses, as an evaluation value, the reciprocal of the minimum distance between a road and a path candidate or the value of a collision risk map. For evaluation of the convenience, the entire length of a trajectory or the length of a trajectory from a passing-by mode starting point to an evacuation position/posture candidate can be used. The shorter the trajectory is, the more lowery evaluated the trajectory is. The reason is because, if operation for passing-by takes time, the period of time during which an oncoming vehicle is kept waiting becomes longer, and there is a possibility that an occupant of another vehicle or the subject vehicle feels distrust.

For evaluation of the comfort of ride, acceleration generated to the vehicle traveling along a calculated path, jerk, which represents temporal changes of the acceleration, or the like is used. For example, the value of (the reciprocal of a turning radius)×(the total turning angle) can be used as an evaluation index. This is based on an assumption that a path with larger lateral acceleration or with a longer period of time during which lateral acceleration is generated worsens the comfort of ride. That is, an evaluation value of the comfort of ride decreases as the turning angle increases in a state where the turning radius is large.

For evaluation of the sense of discomfort, the number of turns is used. This is based on an assumption that the sense of discomfort that an occupant of the subject vehicle 2 feels increases as the number of turns increases. For evaluation of the feeling of pressure, the closest distance between a calculated path and another vehicle is used. For example, the reciprocal of the minimum distance between the center of positional coordinates of the other vehicle and the path candidate can be used as an evaluation index. The reason is because a path that is too close to an oncoming vehicle makes occupants of the subject vehicle and the other vehicle feel pressured.

Figure 25:
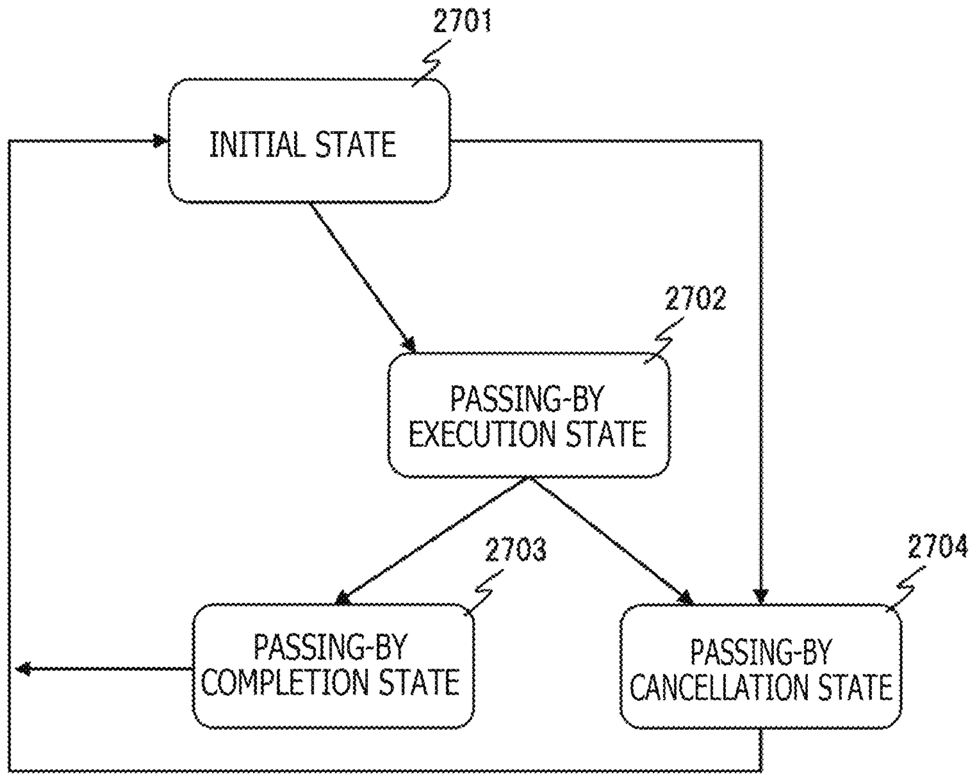
FIG. 25 is a transition diagram depicting a passing-by state managed by a managing section.

FIG. 25 is a diagram depicting transitions of a passing-by state managed by the managing section 2581. The managing section 2581 manages a passing-by state representing the state of passing-by with an oncoming vehicle. The passing-by state includes four states, namely, an initial state 2701, a passing-by execution state 2702, a passing-by completion state 2703, and a passing-by cancellation state 2704. The passing-by state at the time of an operation start is the initial state 2701, and the state transitions from the initial state 2701 as explained next.

In a case where it is determined in the initial state 2701 that passing-by traveling is possible, the state transitions to the passing-by execution state 2702. In a case where it is determined in the initial state 2701 or in the passing-by execution state 2702 that passing-by traveling is not possible, the state transitions to the passing-by cancellation state 2704. In a case where passing-by traveling is completed in the passing-by execution state 2702, the state transitions to the passing-by completion state 2703. In a case where the state of an oncoming vehicle, the environmental condition, or the like has changed during passing-by traveling and it is determined that passing-by traveling is not possible, the state transitions to the passing-by cancellation state 2704. After the transition to the passing-by completion state 2703 or the passing-by cancellation state 2704, the state returns to the initial state 2701 again. Hereinafter, each state is explained.

Figure 26:
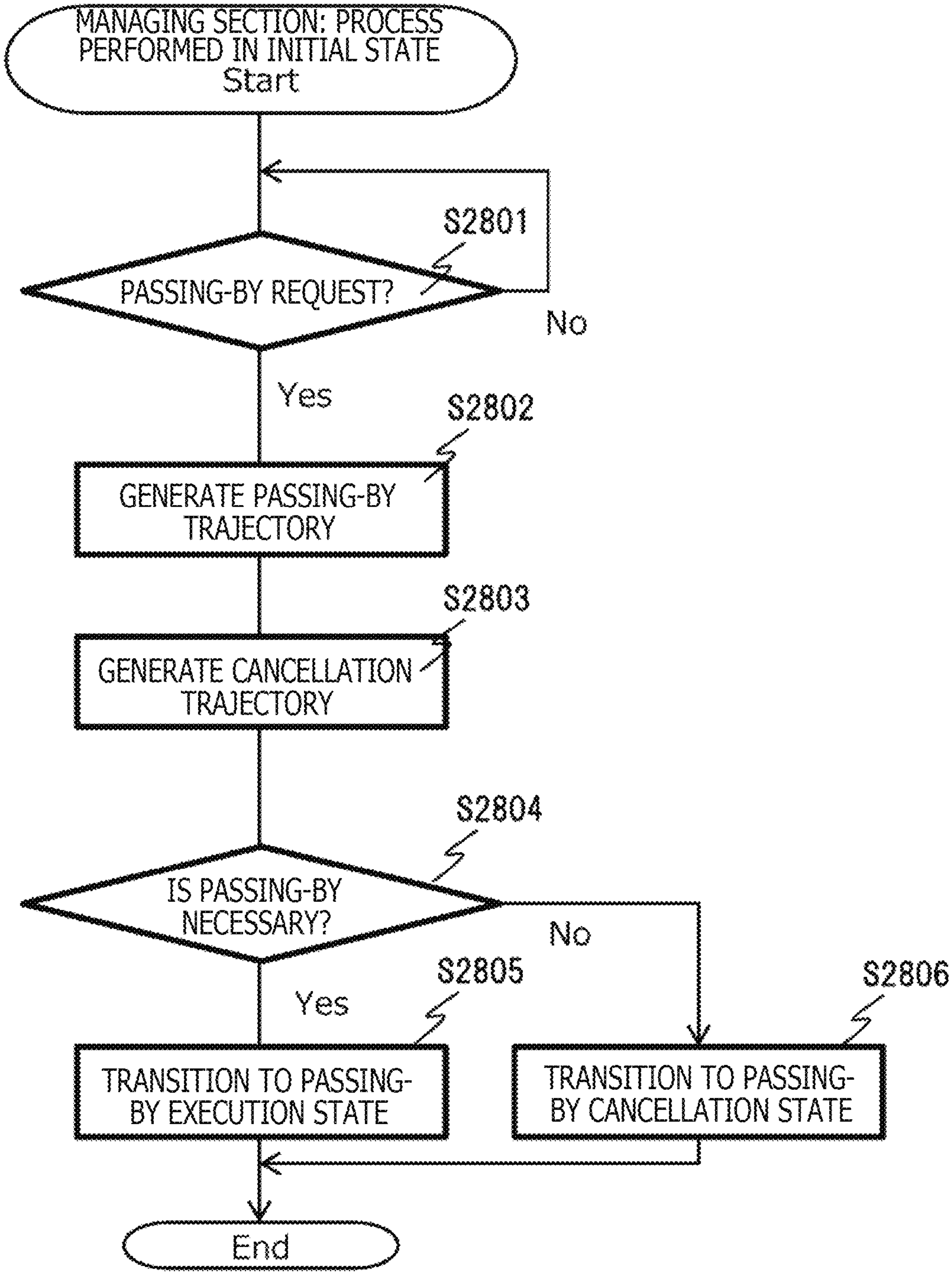
FIG. 26 is a flowchart depicting a process executed by the managing section in an initial state.

FIG. 26 is a flowchart depicting a process executed by the managing section 2581 in the initial state 2701. At Step S2801, first, the managing section 2581 performs a passing-by request check. Specifically, in a case where the value "V4," which is the weight of a traveling mode corresponding to "passing by" generated by a driving planning section 2501, is equal to or greater than a predetermined value, the managing section 2581 makes an affirmative determination and proceeds to Step S2802. In a case where the value "V4" is smaller than the predetermined value, the managing section 2581 makes a negative determination and returns to Step S2801.

At Step S2802, the managing section 2581 uses a passing-by trajectory generating section 2508 to generate a trajectory necessary for passing-by traveling. A detailed process of this step is as depicted in FIG. 21. At subsequent Step S2803, the managing section 2581 generates a cancellation trajectory.

The cancellation trajectory is a trajectory that leads to an arrival position candidate from the current position of the subject vehicle 2 and that is different from a passing-by trajectory. For example, the cancellation trajectory is a trajectory formed by linking the current position of the subject vehicle 2 and the arrival position candidate with a straight line.

Figure 27:
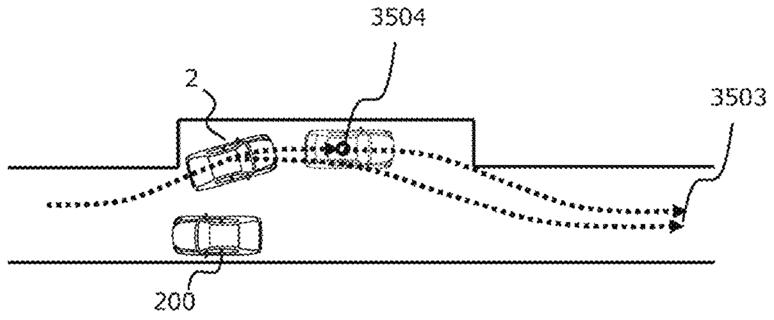
FIG. 27 is a figure depicting examples of a passing-by trajectory and a cancellation trajectory.

FIG. 27 is a figure depicting examples of the passing-by trajectory and the cancellation trajectory. In FIG. 27, a path that leads to the arrival position candidate 3503 through the evacuation position/posture candidate 3504 is the passing-by trajectory. Meanwhile, a path that leads to the arrival position candidate 3503 bypassing the evacuation position/posture candidate 3504 from the current position of the vehicle 2 is the cancellation trajectory. Reference is now back to FIG. 26, and the explanation is continued.

At subsequent Step S2804, the managing section 2581 determines whether or not passing-by is necessary. Specifically, by referring to the collision risk map data group 37 and the immobility risk map data group 38, the managing section 2581 determines that passing-by is necessary in a case where the cancellation trajectory overlaps a risk area, and determines that passing-by is not necessary in a case where the cancellation trajectory does not overlap a risk area. In a case where it is determined that passing-by is necessary, the managing section 2581 proceeds to Step S2805. In a case where it is determined that passing-by is not necessary, the managing section 2581 proceeds to Step S2806. At Step S2805, the managing section 2581 makes the passing-by state transition to the passing-by execution state 2702, and ends the process depicted in FIG. 26. At Step S2806, the managing section 2581 makes the passing-by state transition to the passing-by cancellation state 2704, and ends the process depicted in FIG. 26.

Figure 28:
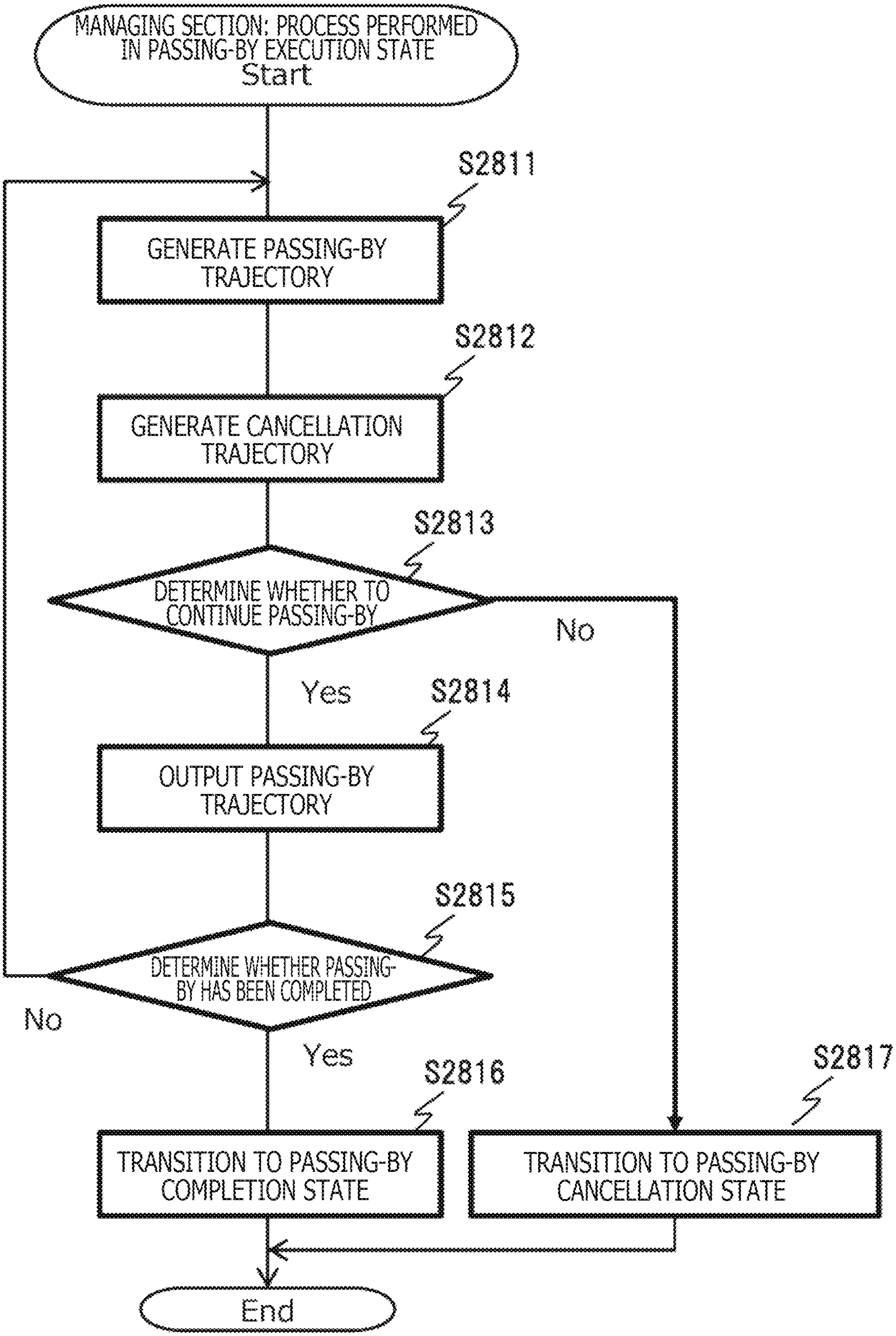
FIG. 28 is a flowchart depicting a process executed by the managing section in a passing-by execution state.

FIG. 28 is a flowchart depicting a process executed by the managing section 2581 in the passing-by execution state 2702. First, at Step S2811, the managing section 2581 generates a trajectory necessary for passing-by traveling. A detailed process of this step is as depicted in FIG. 21. At subsequent Step S2812, the managing section 2581 generates a cancellation trajectory. The method of generating the cancellation trajectory is as explained as Step S2803 in FIG. 26.

At subsequent Step S2813, the managing section 2581 compares the generated passing-by trajectory and cancellation trajectory with each other, and performs evaluation on the basis of indices regarding the safety and the comfort of ride. For example, in a case where it is determined that there is a fear that the subject vehicle 2 rapidly approaches another vehicle or an object around the subject vehicle 2 in a case where the subject vehicle is caused to travel on the basis of the passing-by trajectory, the managing section 2581 determines that it is not possible to continue passing-by traveling. In a case where it is determined that passing-by continuation is possible, the managing section 2581 proceeds to Step S2814. In a case where it is determined that passing-by continuation is not possible, the managing section 2581 proceeds to Step S2817.

At Step S2814, the managing section 2581 outputs the generated passing-by trajectory to a trajectory arbitrating section 2505. In a case where the trajectory output here is selected by the trajectory arbitrating section 2505, control is performed such that the subject vehicle 2 travels along this trajectory. At subsequent Step S2815, on the basis of self-position information, lane information, and the like, the managing section 2581 determines whether or not the position of the subject vehicle 2 has reached an end area of the passing-by mode, i.e., an arrival position candidate. In a case where it is determined that the subject vehicle 2 has reached the arrival position candidate, the managing section 2581 proceeds to Step S2816. In a case where it is determined that the subject vehicle 2 has not reached the arrival position candidate, the managing section 2581 returns to Step S2811. At Step S2816, the managing section 2581 makes the passing-by state transition to the passing-by completion state 2703, and ends the process depicted in FIG. 28. At Step S2817, the managing section 2581 makes the passing-by state transition to the passing-by cancellation state 2704, and ends the process depicted in FIG. 28.

Figure 29:
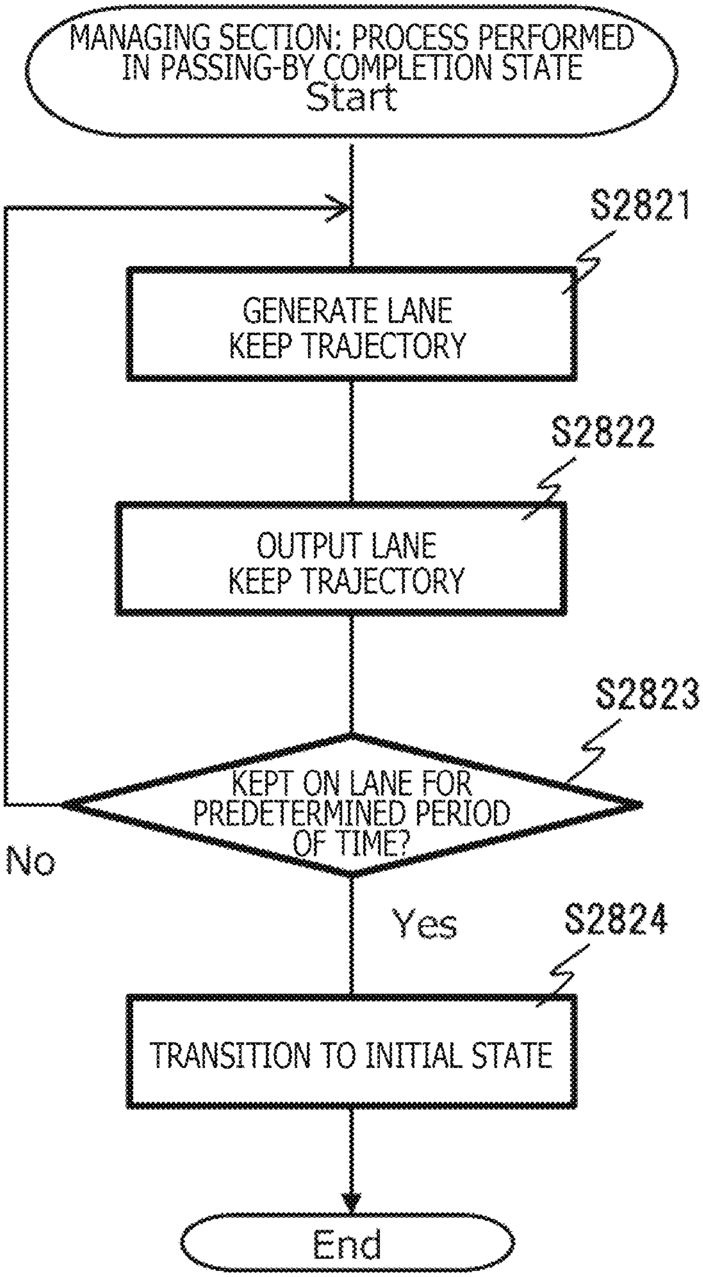
FIG. 29 is a flowchart depicting a process executed by the managing section in a passing-by completion state.

FIG. 29 is a flowchart depicting a process executed by the managing section 2581 in the passing-by completion state 2703. First, at Step S2821, the managing section 2581 generates a lane keep trajectory. Specifically, using the lane keep trajectory generating section 2502, or by a process similar to that of the lane keep trajectory generating section 2502, the managing section 2581 generates a trajectory for keeping the subject vehicle 2 in the traveling lane where the subject vehicle 2 is currently traveling. At subsequent Step S2822, the managing section 2581 outputs the trajectory generated at Step S2821 to the trajectory arbitrating section 2505. In a case where the trajectory output here is selected by the trajectory arbitrating section 2505, control is performed such that the subject vehicle 2 travels along this trajectory.

At subsequent Step S2823, the managing section 2581 determines whether or not the subject vehicle 2 has been kept in the same lane for a predetermined period of time. In a case where it is determined that the subject vehicle 2 has been kept in the lane for the predetermined period of time or longer, the managing section 2581 proceeds to Step S2824. In a case where it is determined that the period of time for which the subject vehicle 2 has been kept in the lane is shorter than the predetermined value, the managing section 2581 returns to Step S2821. At Step S2824, the managing section 2581 makes the passing-by state transition to the initial state 2701, and ends the process depicted in FIG. 29.

Figure 30:
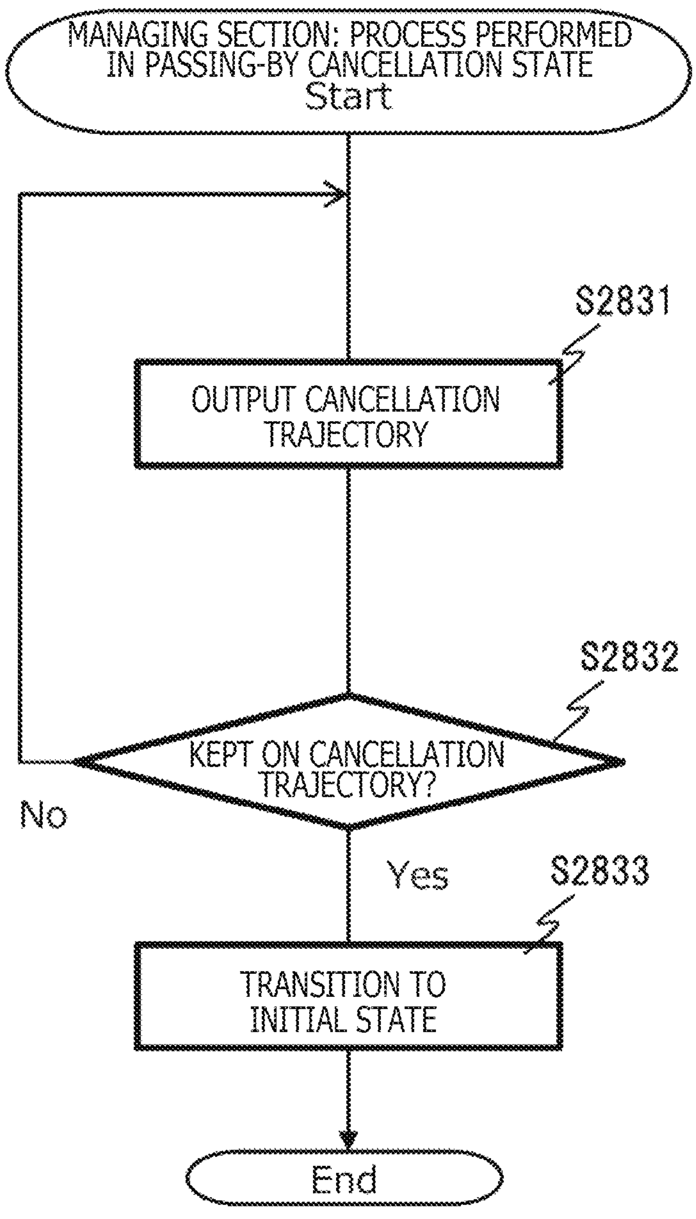
FIG. 30 is a flowchart depicting a process executed by the managing section in a passing-by cancellation state.

FIG. 30 is a flowchart depicting a process executed by the managing section 2581 in the passing-by cancellation state 2704. First, at Step S2831, the managing section 2581 outputs the cancellation trajectory having already been calculated, to the trajectory arbitrating section 2505. In a case where the trajectory output here is selected by the trajectory arbitrating section 2505, control is performed such that the subject vehicle 2 travels along this trajectory. At subsequent Step S2832, the managing section 2581 determines whether or not the subject vehicle 2 has been kept on the cancellation trajectory for a predetermined period of time, i.e., whether or not the subject vehicle 2 has been able to travel along the cancellation trajectory. In a case where it is determined that the subject vehicle 2 has been kept on the cancellation trajectory for the predetermined period of time or longer, the managing section 2581 proceeds to Step S2833. In a case where it is determined that the period of time for which the subject vehicle 2 has been kept on the cancellation trajectory is shorter than the predetermined value, the managing section 2581 returns to Step S2831. At Step S2833, the managing section 2581 makes the passing-by state transition to the initial state 2701, and ends the process depicted in FIG. 30.

Figure 31:
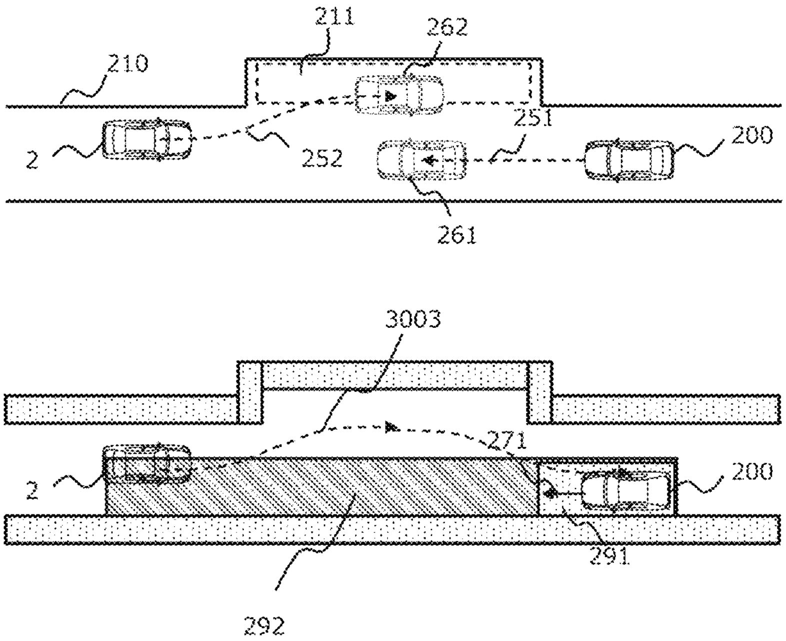
FIG. 31 is a schematic diagram depicting a motion of a vehicle based on a process performed by the electronic control apparatus.

FIG. 31 is a schematic diagram depicting a motion of the vehicle 2 based on a process performed by the electronic control apparatus 3. In the scene depicted in FIG. 31, the road is a narrow road, the subject vehicle 2 is performing automated driving traveling from the left side to the right side in the figure, and there is an oncoming vehicle [3200] 200 ahead of the subject vehicle 2. The subject vehicle 2 senses that there is the evacuation area 211 ahead on the left side on the basis of at least either the sensor detection data group 31 or the road environment data group 33. An electronic control apparatus 3 generates the collision risk map data group 37 and the immobility risk map data group 38, and, on the basis of them, generates a passing-by trajectory 3003 from the viewpoints of the comfort of ride, the safety, and the like. By generating the passing-by trajectory 3003, it is possible to avoid a collision between the subject vehicle and the oncoming vehicle and to prevent an occupant from being given worsened comfort of ride or a feeling of anxiety.

According to the fifth embodiment mentioned above, the following effects and advantages are achieved.

(12) The electronic control apparatus 3 is mounted on the vehicle 2 and plans an action to pass by another mobile object. The electronic control apparatus 3 includes the passing-by trajectory generating section 2508 that generates evacuation position candidates which are candidates of evacuation positions to which the vehicle is caused to evacuate away from the mobile object at the time of an action to pass by the mobile object (S3305 in FIG. 21), generates arrival position candidates which are candidates of positions that are to be arrived at after the evacuation position candidates are passed through (S3306 in FIG. 21), and generates trajectories that pass through the current position of the vehicle, the positions of the evacuation position candidates, and the positions of the arrival position candidates (S3307 in FIG. 21). Thus, the electronic control apparatus 3 can generate a trajectory taking into consideration also a situation after passing by another mobile object.

(13) The trajectory generating section 2582 of the passing-by trajectory generating section 2508 generates evacuation position candidates on the basis of at least either the size of the mobile object or the speed of the mobile object.

(14) The trajectory generating section 2582 of the passing-by trajectory generating section 2508 generates a plurality of trajectories, evaluates each of the plurality of trajectories, and selects an optimal trajectory (S3308 in FIG. 21).

(15) The trajectory generating section 2582 of the passing-by trajectory generating section 2508 evaluates each of the plurality of trajectories on the basis of at least one of the safety, the convenience, the comfort of ride, the sense of discomfort, and the feeling of pressure on an oncoming vehicle (S3308 in FIG. 21).

First Modification Example of Fifth Embodiment

In the fifth embodiment mentioned above, the trajectory generating section 2582 decides evacuation position/posture candidates by referring to a collision risk map and an immobility risk map. However, the trajectory generating section 2582 may decide evacuation position/posture candidates without referring to a collision risk map and an immobility risk map. For example, the trajectory generating section 2582 may extract evacuation areas from the sensor detection data group 31 or the road environment data group 33 and set evacuation position candidates randomly in the evacuation areas or set an evacuation position/posture candidate at a position farthest from an oncoming vehicle in the evacuation areas. Furthermore, the trajectory generating section 2582 may set evacuation position/posture candidates on the basis of the speed of the subject vehicle 2 and the speed of an oncoming vehicle as well as the positional relation among the subject vehicle, the oncoming vehicle, and evacuation areas. For example, an evacuation position/posture candidate may be set in an evacuation area closest to a position where the subject vehicle 2 and the oncoming vehicle would collide with each other if the subject vehicle 2 and the oncoming vehicle keep traveling at the respective current speeds.

Second Modification Example of Fifth Embodiment

In the fifth embodiment mentioned above, the trajectory generating section 2582 evaluates a plurality of calculated trajectory candidates in terms of the five viewpoints and adopts the most highly evaluated path. However, the trajectory generating section 2582 may calculate only one trajectory candidate and use the trajectory candidate without evaluation of it, or may use one trajectory candidate selected randomly from a plurality of trajectory candidates. Note that the trajectory candidate may be corrected as appropriate in this case. For example, in a case where only one trajectory candidate is calculated and there is an obstacle on the trajectory candidate, the trajectory candidate may be corrected such that the obstacle is avoided.

Third Modification Example of Fifth Embodiment

At Step S2824 in FIG. 29, the traveling mode may be changed to the lane keep mode, i.e., a trajectory selected by the trajectory arbitrating section 2505 may be changed to a trajectory generated by the lane keep trajectory generating section 2502.

Fourth Modification Example of Fifth Embodiment

In the embodiment mentioned above, the trajectory generating section 2582 decides not only a location to which the subject vehicle 2 evacuates but also a posture of the subject vehicle 2. However, the trajectory generating section 2582 may not decide a posture. That is, “evacuation position/posture candidates” in the fifth embodiment may be replaced with “evacuation position candidates.”

Sixth Embodiment

A sixth embodiment of the electronic control apparatus is explained with reference to FIG. 32 and FIG. 33. In the following explanation, constituent elements which are the same as constituent elements in the fifth embodiment are given the same reference symbols, and differences are mainly explained. Matters that are not explained particularly are the same as their counterparts in the fifth embodiment. The present embodiment is mainly different from the fifth embodiment in that an arrival position candidate is changed taking into consideration the environmental condition around the arrival position candidate.

Figure 32:
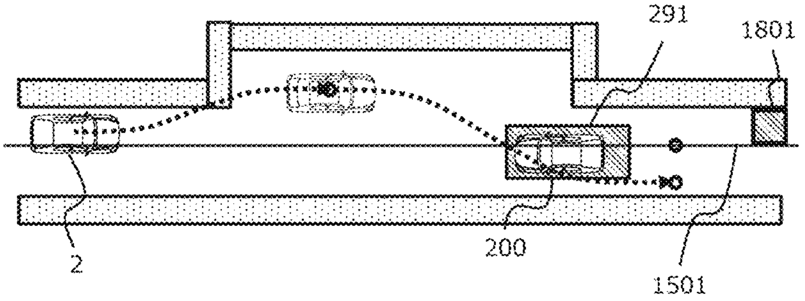
FIG. 32 is a figure depicting an example of a scene for which a process performed in a sixth embodiment is effective.
Figure 33:
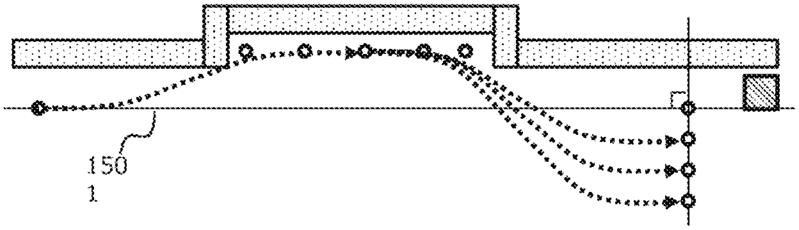
FIG. 33 is a figure depicting a trajectory generation example in the sixth embodiment.

FIG. 32 is a figure depicting an example of a scene for which a process performed in the sixth embodiment is effective. In the example depicted in FIG. 32, there is an obstacle 1801 such as an electric pole or a fallen object on a road around an arrival position candidate. In such a case, if an arrival position candidate is set at a position that is axially symmetrical to an evacuation position/posture candidate as with the fifth embodiment, traveling to avoid an object 1801 becomes necessary immediately after the end of the passing-by traveling mode, and there is a possibility that an occupant of the subject vehicle 2 is given a feeling of anxiety.

Accordingly, the passing-by trajectory generating section 2508 in the present embodiment generates a passing-by trajectory taking into consideration the state around an arrival position candidate. That is, as depicted in FIG. 33, several arrival position candidates are further generated around an arrival position candidate. Then, trajectory candidates are generated for all of them, all the generated trajectory candidates are evaluated, and an optimal trajectory is selected. For example, as depicted in FIG. 33, the generated additional arrival position candidates are generated next to each other in a direction vertical to the lane centerline 1501. It should be noted that arrival position candidates may be generated next to each other in an arc direction about the position of the object 1801. By generating a passing-by trajectory taking into consideration also the situation at an arrival position candidate in this manner, the mode switch can take place safely even in a case where the passing-by traveling mode has ended and the mode has switched to a lane keep mode or an occupant driving mode.

According to the sixth embodiment mentioned above, the following effects and advantages are achieved.

(16) The trajectory generating section 2582 of the passing-by trajectory generating section 2508 decides evacuation position candidates on the basis of outputs of the external sensor group 4 that performs sensing around the vehicle. The trajectory generating section 2582 generates, as evacuation position candidates, positions where there are no objects within a predetermined distance. In other words, the trajectory generating section 2582 excludes, from evacuation position candidates, positions where there are objects within the predetermined distance. Accordingly, it is possible to avoid an operation to avoid objects immediately after the passing-by traveling mode has ended.

Seventh Embodiment

A seventh embodiment of the electronic control apparatus is explained with reference to FIG. 34. In the following explanation, constituent elements which are the same as constituent elements in the fifth embodiment are given the same reference symbols, and differences are mainly explained. Matters that are not explained particularly are the same as their counterparts in the fifth embodiment. The present embodiment is mainly different from the fifth embodiment in that a blind spot is taken into consideration in selection of evacuation position/posture candidates.

Figure 34:
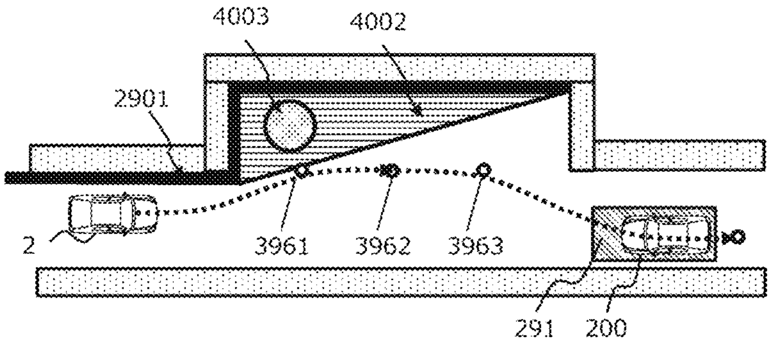
FIG. 34 is a figure depicting an example of a scene for which a process performed in a seventh embodiment is effective.

FIG. 34 is a figure depicting an example of a scene for which a process performed in the seventh embodiment is effective. The electronic control apparatus 3 in the present embodiment selects an evacuation position/posture candidate avoiding a blind spot area. In FIG. 34, there is a blind spot generating object 2901 such as a tall wall around a road boundary 3901. Due to the blind spot generating object 2901, a blind spot area 4002 for the external sensor group 4 is generated around an evacuation space. There is a possibility that there is a large obstacle 4003 or the like in the blind spot area 4002.

In a case where the trajectory generating section 2582 generates three evacuation position/posture candidates denoted by reference symbols 3961 to 3963, if the reference symbol 3961 is adopted, this is not preferable because there is a possibility that the obstacle 4003 makes it difficult for the subject vehicle 2 to stop. Hence, in a case where there is a blind spot area, the trajectory generating section 2582 selects one of waiting position/posture candidates excluding evacuation position/posture candidates that are within a predetermined distance from the blind spot area 4002. Note that, instead of uniformly excluding such waiting position/posture candidates, the trajectory generating section 2582 may add the distances between candidate trajectories and a blind spot area as a candidate trajectory evaluation item.

According to the seventh embodiment mentioned above, the following effects and advantages are achieved.

(17) The trajectory generating section 2582 of the passing-by trajectory generating section 2508 decides evacuation position candidates on the basis of outputs of the external sensor group 4 that performs sensing around the vehicle. The trajectory generating section 2582 generates, as an evacuation position candidate, a position which is not a blind spot of the external sensor group 4. In other words, the trajectory generating section 2582 excludes, from evacuation position candidates, a blind spot of the external sensor group 4. In passing-by traveling in a state where there is a blind spot area like this, by generating a passing-by trajectory taking into consideration the blind spot area, it is possible to prevent a target waiting position/posture or a target trajectory from being changed during passing-by traveling, and it is possible to prevent an occupant from being given worsened comfort of ride or a feeling of anxiety.

Eighth Embodiment

An eighth embodiment of the electronic control apparatus is explained with reference to FIG. 35 and FIG. 36. In the following explanation, constituent elements which are the same as constituent elements in the fifth embodiment are given the same reference symbols, and differences are mainly explained. Matters that are not explained particularly are the same as their counterparts in the fifth embodiment. The present embodiment is mainly different from the fifth embodiment in that a notification is made in a case where a path cannot be generated.

Figure 35:
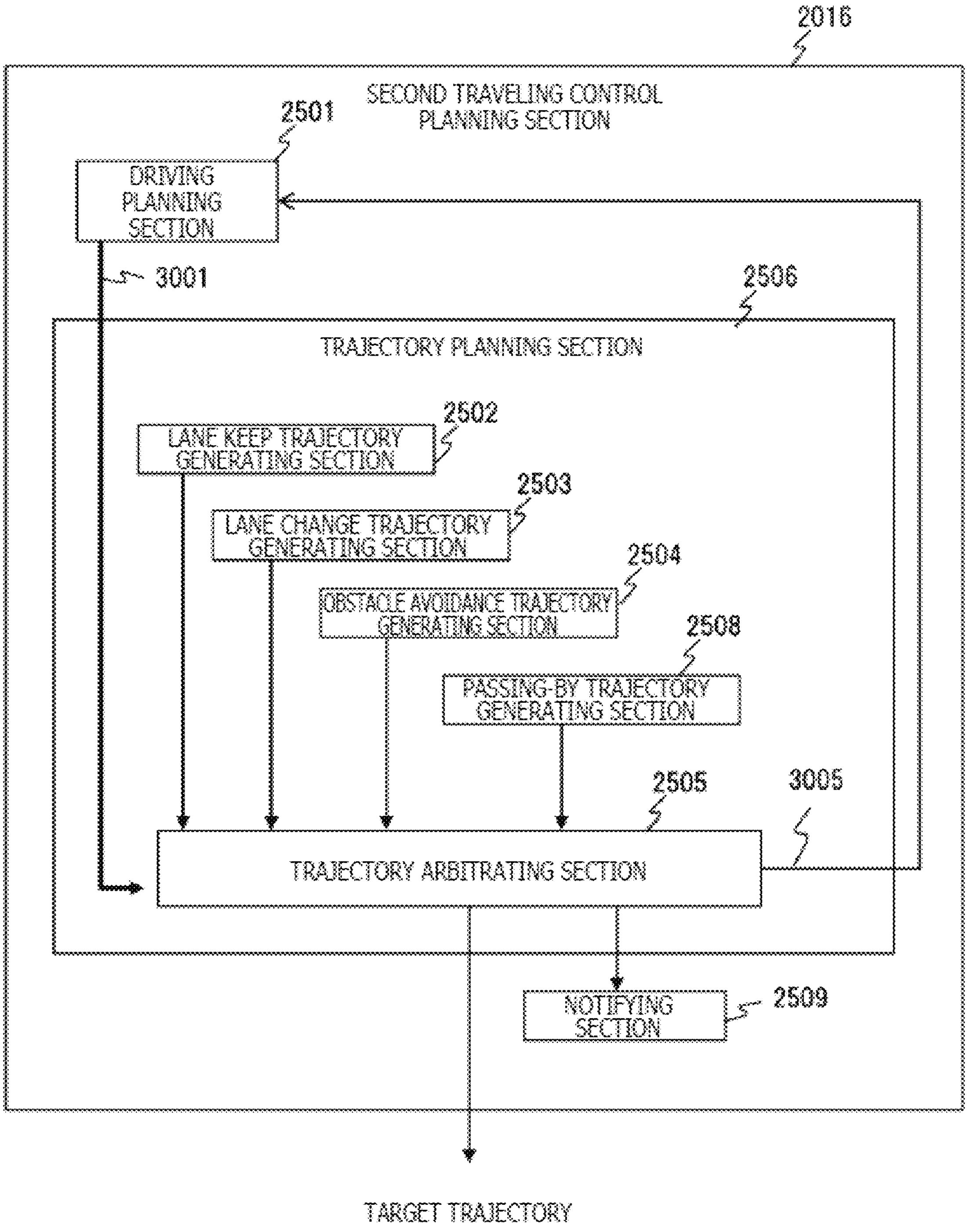
FIG. 35 is a functional configuration diagram of the second traveling control planning section in an eighth embodiment.

FIG. 35 is a functional configuration diagram of the second traveling control planning section 2016 in the eighth embodiment. The second traveling control planning section 2016 in the present embodiment further includes a notifying section 2509, in addition to the configuration of the second traveling control planning section 2016 in the fifth embodiment. The notifying section 2509 externally makes a notification as to an output of the trajectory arbitrating section 2505. The notification destination is not limited to the inside of the subject vehicle 2 and may be around the subject vehicle 2 or a remote location. The notification method may use any of sound, videos, and vibrations, and a notification may be made not directly but via communication. That is, the notifying section 2509 can be realized by a sound output device, a video output device, a vibrator, a communication module, or the like.

The second traveling control planning section 2016 in the present embodiment notifies an occupant or the like of the subject vehicle 2 via the notifying section 2509 that a path cannot be generated, in a case where there are no trajectories along which the vehicle 2 can travel. As mentioned before, the trajectory arbitrating section 2505 evaluates each trajectory generated by the lane keep trajectory generating section 2502, the lane change trajectory generating section 2503, the obstacle avoidance trajectory generating section 2504, the passing-by trajectory generating section 2508, or the passing-by trajectory generating section 2508. For example, in a case where it is determined that all of the trajectories collide with an obstacle, the trajectory arbitrating section 2505 makes a notification that a path cannot be generated.

Figure 36:
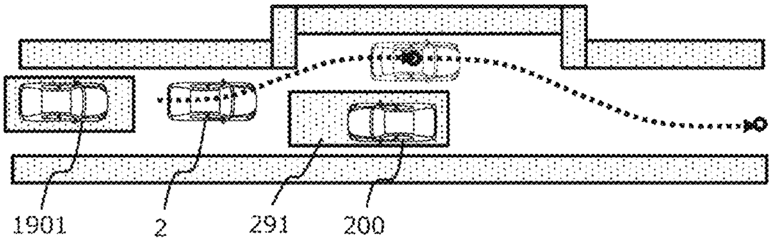
FIG. 36 is a figure depicting an example of a scene for which a process performed in the eighth embodiment is effective.

FIG. 36 is a figure depicting an example of a scene for which a process performed in the eighth embodiment is effective. In FIG. 36, there is a following vehicle 1901 behind the subject vehicle 2, and there is the second vehicle 200 ahead of the subject vehicle 2. The subject vehicle 2 has generated a passing-by trajectory, but the second vehicle 200 has got close to the subject vehicle 2. Thus, the collision risk areas 291 due to the outer sides of the road, the following vehicle 1901, and the second vehicle 200 surround the subject vehicle 2. In this state, the subject vehicle 2 cannot move since the subject vehicle 2 will contact any of the collision risk areas 291 no matter in which direction the subject vehicle 2 advances. Because of this, the second traveling control planning section 2016 notifies an occupant or the like of the subject vehicle 2 that a path cannot be generated. Thereby, for example, it is expected that the situation is ameliorated by manual driving by the occupant of the subject vehicle 2.

According to the eighth embodiment mentioned above, the following effects and advantages are achieved.

(18) The trajectory arbitrating section 2505 decides a trajectory along which the vehicle 2 travels, from a plurality of trajectories including trajectories generated by the passing-by trajectory generating section 2508 and the lane keep trajectory generating section 2502, and makes a notification via the notifying section 2509 that a trajectory cannot be calculated, in a case where there are no trajectories along which the vehicle 2 can travel. Thus, an occupant or the like of the subject vehicle 2 is notified that a path cannot be generated, and, for example, it is expected that the situation is ameliorated by manual driving by the occupant of the subject vehicle 2.

In each embodiment or modification example mentioned above, the configuration of functional blocks is merely an example. Several functional configurations that are depicted as separate functional blocks may be configured integrally, or a configuration represented by one functional block diagram may be divided into two or more functions. In addition, some of the functions of each functional block may be realized by another functional block, in another possible configuration.

In each embodiment or modification example mentioned above, programs are stored on an undepicted ROM, but the programs may be stored on the storage section 30. In addition, the electronic control apparatus may include an undepicted input/output interface, and programs may be read in from another apparatus when necessary via the input/output interface and a medium that the electronic control apparatus can use. Here, for example, the medium means a storage medium that can be attached to and detached from the input/output interface or a communication medium, i.e., a wired network, a wireless network, an optical network, or another network, or means carrier waves or digital signals that are propagated through such a network. In addition, some or all of the functions realized by programs may be realized by a hardware circuit or an FPGA.

The respective embodiments and modification examples mentioned above may be combined with each other. Whereas various embodiments and modification examples are explained in the description above, the present invention is not limited to the contents of them. Other aspects that can be conceived of within the scope of the technical idea of the present invention are also included in the scope of the present invention.

DESCRIPTION OF REFERENCE SYMBOLS

2: Vehicle, subject vehicle
3: Electronic control apparatus
11: Information acquiring section
12: Coordinated action planning section
13: Mobile object action predicting section
14: Collision risk map generating section
15: Immobility risk map generating section
16: Traveling control planning section
17: Information output section
37: Collision risk map data group
38: Immobility risk map data group
291: Collision risk area
292: Immobility risk area
292-1: Main immobility risk area
292-2: Low immobility risk area
2501: Driving planning section
505: Trajectory arbitrating section
602: Trajectory generating section
2016: Second traveling control planning section
2505: Trajectory arbitrating section
2508: Trajectory generating section Passing-by trajectory generating section

The invention claimed is:

1. An electronic control apparatus mounted on a vehicle, the electronic control apparatus comprising:

an information acquiring section that acquires traveling environment information concerning a traveling environment around the vehicle;

an immobility risk area estimating section that estimates an immobility restriction area on a basis of the traveling environment information, the immobility restriction area being an area where, if the vehicle is immobilized therein, the vehicle obstructs an action by another mobile object which is a mobile object other than the vehicle, and being an area where immobility of the vehicle is restricted; and a traveling control planning section that plans traveling control of the vehicle on a basis of the estimated immobility restriction area, wherein in a case where the vehicle needs to be immobilized in a predetermined area, the traveling control planning section plans traveling control such that the vehicle is immobilized in an area which is in the predetermined area but does not overlap the immobility restriction area.

2. The electronic control apparatus according to claim 1, wherein the other mobile object is a mobile object included in the traveling environment information and located around the vehicle, the electronic control apparatus further includes a coordinated action planning section that decides a coordinated action procedure coordinated with the other mobile object, and the immobility restriction area is an area where, if the vehicle is immobilized therein, the vehicle obstructs an action by the other mobile object in the coordinated action procedure.

3. The electronic control apparatus according to claim 2, wherein the immobility risk area estimating section estimates a mobile object estimated action area where the other mobile object can pass through in an action by the other mobile object in the coordinated action procedure, and estimates the immobility restriction area on a basis of the other mobile object estimated action area.

4. The electronic control apparatus according to claim 2, wherein the traveling control planning section plans such a target waiting position/posture of the vehicle in the coordinated action procedure that the target waiting position/posture does not overlap the immobility restriction area.

5. The electronic control apparatus according to claim 4, wherein the immobility restriction area includes information concerning a degree of hindrance to implementation of an action by the other mobile object, and, in a case where there are no target waiting positions/postures that the immobility restriction area does not overlap, the traveling control planning section permits planning of a target waiting position/posture that overlaps an area where the degree of hindrance to implementation of an action is low.

6. The electronic control apparatus according to claim 1, wherein the traveling control planning section plans traveling control such that a period of time of immobility in the immobility restriction area is equal to or shorter than a predetermined value.

7. The electronic control apparatus according to claim 1, wherein the immobility risk area estimating section estimates the immobility restriction area further on a basis of traffic regulation information concerning an area around the vehicle included in the traveling environment information.

8. The electronic control apparatus according to claim 7, wherein the traffic regulation information is a parking prohibited area or a stop prohibited area.

9. The electronic control apparatus according to claim 1, further comprising:

a collision risk area estimating section that estimates a collision risk area with a risk of a collision of the vehicle with an obstacle on a basis of the traveling environment information, wherein the traveling control planning section plans such traveling control that the vehicle does not enter the collision risk area and the vehicle is not immobilized in the immobility restriction area.

10. The electronic control apparatus according to claim 2, further comprising:

a passing-by trajectory generating section that generates, at a position not overlapping the immobility restriction area, an evacuation position candidate which is a candidate of an evacuation position to which the vehicle is caused to evacuate away from the other mobile object at time of an action to pass by the other mobile object, generates an arrival position candidate which is a candidate of an arrival position that is to be arrived at after the evacuation position candidate is passed through, and generates a trajectory that passes through a current position of the vehicle, a position of the evacuation position candidate, and a position of the arrival position candidate.

11. The electronic control apparatus according to claim 1, wherein the other mobile object is a mobile object that can appear around the vehicle at a future time point and that is estimated from the traveling environment information.

12. A planning method executed by an electronic control apparatus mounted on a vehicle, the planning method comprising:

acquiring traveling environment information concerning a traveling environment around the vehicle;

estimating an immobility restriction area on a basis of the traveling environment information, the immobility restriction area being an area where, if the vehicle is immobilized therein, the vehicle obstructs an action by a mobile object other than the vehicle, and being an area where immobility of the vehicle is restricted;

planning traveling control of the vehicle on a basis of the estimated immobility restriction area; and planning, in a case where the vehicle needs to be immobilized in a predetermined area, traveling control such that the vehicle is immobilized in an area which is in the predetermined area but does not overlap the immobility restriction area.

* * * * *